US012332987B2

(12) United States Patent
Bienfait

(10) Patent No.: US 12,332,987 B2
(45) Date of Patent: Jun. 17, 2025

(54) SECURE ACCESS TOKEN DEVICE WITH BIOMETRIC AUTHENTICATION AND RELATED METHODS

(71) Applicant: Rb Global Mobile Solutions, LLC, Peachtree Corners, GA (US)

(72) Inventor: Roberta Ann Bienfait, Peachtree Corners, GA (US)

(73) Assignee: RB GLOBAL MOBILE SOLUTIONS, LLC, Peachtree Corners, GA (US)

( * ) Notice: Subject to any disclaimer, the term of this patent is extended or adjusted under 35 U.S.C. 154(b) by 0 days.

(21) Appl. No.: 18/506,461

(22) Filed: Nov. 10, 2023

(65) Prior Publication Data

US 2024/0078302 A1    Mar. 7, 2024

Related U.S. Application Data

(63) Continuation-in-part of application No. 17/650,253, filed on Feb. 8, 2022, which is a continuation-in-part
(Continued)

(51) Int. Cl.
G06F 21/32        (2013.01)

(52) U.S. Cl.
CPC .................. *G06F 21/32* (2013.01)

(58) Field of Classification Search
CPC ... G06F 21/32; G06F 21/35; G06Q 20/40145; H04L 9/3234; H04L 63/0861
(Continued)

(56) References Cited

U.S. PATENT DOCUMENTS

| 4,760,245 A | 7/1988 | Fukaya |
| 7,046,405 B2 | 5/2006 | Kitamura et al. |

(Continued)

FOREIGN PATENT DOCUMENTS

| CN | 108234557 A | 6/2018 |
| EP | 3057047 | 8/2016 |

(Continued)

OTHER PUBLICATIONS

Bill Zalud "Is 2016 the Year for Biometrics at Last?" www.securitymagazine.com/articles/87088-Is-the-Year-for-Biometrics-at-Last; May 1, 2016; pp. 4.
(Continued)

*Primary Examiner* — Hani M Kazimi
(74) *Attorney, Agent, or Firm* — Allen, Dyer, Doppelt + Gilchrist, PA

(57) ABSTRACT

A secure access token device includes a portable housing, a battery carried by the portable housing, a biometric input device carried by the portable housing and configured to generate biometric data of a user, a status visual indicator carried by the portable housing, an RF antenna carried by the portable housing, a memory carried by the portable housing, and a processor. The processor is carried by the portable housing and coupled to the battery, the biometric input device, the status visual indicator, the RF antenna, and the memory. The processor is configured to store unique tokens in the memory for accessing respective different secured resources, determine a selected unique token from the unique tokens based upon an additional input on the biometric input device, and transit via the RF antenna an RF signal based upon the selected unique token when the biometric data matches an authentic biometric data template.

20 Claims, 33 Drawing Sheets

Related U.S. Application Data of application No. 15/733,702, filed as application No. PCT/US2019/064029 on Dec. 2, 2019, now Pat. No. 11,282,071.

(60) Provisional application No. 63/383,329, filed on Nov. 11, 2022, provisional application No. 62/773,725, filed on Nov. 30, 2018.

(58) Field of Classification Search
USPC .......................................... 705/3–44; 726/18
See application file for complete search history.

(56) References Cited

U.S. PATENT DOCUMENTS

| | | | |
|---|---|---|---|
| 7,444,380 B1 | 10/2008 | Diamond | |
| 7,873,577 B1 | 1/2011 | Duhaime et al. | |
| 8,025,226 B1 | 9/2011 | Hopkins, III et al. | |
| 8,368,718 B2 | 2/2013 | Shimada | |
| 8,769,406 B2 | 7/2014 | Hashimoto et al. | |
| 9,354,603 B2 | 5/2016 | Motoi et al. | |
| 9,961,489 B2 | 5/2018 | Elias | |
| 10,176,415 B2 | 1/2019 | Wendling | |
| 10,200,812 B2 | 2/2019 | Elias | |
| 10,209,940 B2 | 2/2019 | Sirpal et al. | |
| 10,474,802 B2 | 11/2019 | Wendling | |
| 10,531,261 B2 | 1/2020 | Salihi | |
| 10,726,115 B2 | 7/2020 | Larsen | |
| 11,410,230 B1* | 8/2022 | Olson | G06F 21/6245 |
| 11,610,198 B1* | 3/2023 | Doss | G06Q 20/3674 |
| 11,978,284 B2* | 5/2024 | Tsuda | G06V 40/1365 |
| 2004/0123114 A1* | 6/2004 | McGowan | G07C 9/257 |
| | | | 713/186 |
| 2006/0000895 A1* | 1/2006 | Bonalle | G06F 21/34 |
| | | | 235/382 |
| 2006/0230284 A1* | 10/2006 | Fiske | G07F 7/1008 |
| | | | 713/184 |
| 2008/0037040 A1 | 2/2008 | Hashimoto et al. | |
| 2008/0037088 A1 | 2/2008 | Sako et al. | |
| 2010/0228991 A1* | 9/2010 | Billings | G06F 21/34 |
| | | | 713/185 |
| 2012/0096344 A1 | 4/2012 | Ho et al. | |
| 2013/0103581 A1 | 4/2013 | Barry et al. | |
| 2013/0187831 A1 | 7/2013 | Sirpal et al. | |
| 2013/0339747 A1 | 12/2013 | Gangi | |
| 2014/0183269 A1* | 7/2014 | Glaser | G06K 19/07701 |
| | | | 235/492 |
| 2015/0317624 A1 | 11/2015 | Saunders | |
| 2017/0039568 A1* | 2/2017 | Tunnell | G06F 21/33 |
| 2017/0213120 A1 | 7/2017 | Bae et al. | |
| 2017/0293263 A1 | 10/2017 | Kitamura et al. | |
| 2018/0204281 A1 | 7/2018 | Painter et al. | |
| 2020/0074056 A1* | 3/2020 | Hruska | H04W 12/06 |
| 2021/0367938 A1* | 11/2021 | Praszczalek | H04L 63/0861 |
| 2022/0036356 A1* | 2/2022 | Praszczalek | G06Q 20/40145 |
| 2022/0224742 A1* | 7/2022 | Cho | H04N 21/6437 |
| 2023/0269249 A1* | 8/2023 | Krishan | H04L 63/102 |
| | | | 726/7 |
| 2024/0135930 A1* | 4/2024 | Chauhan | G06F 21/32 |

FOREIGN PATENT DOCUMENTS

| | | |
|---|---|---|
| JP | 2018-081658 A | 5/2018 |
| WO | WO0022774 | 4/2000 |

OTHER PUBLICATIONS

Bryan Luman "Optical Cards Make a Scorching Impact", ID World 2.1: 14+., Thomson Inc. Mar. 2000. ** See U.S. Appl. No. 17/650,253.

Gerard F. Russell "License photos going digital; Holograms to cut Fraud", Telegram & Gazette, ProQuest Doc Id.: 268551129, Dec. 4, 1994. See U.S. Appl. No. 17/650,253.

Bordes, Roy, N., "Pick a card, any card", Security Management 38.11: 74, ASIS International, Proquest Document Id. 231168004, Nov. 1994.

What to look for on an ID, Bank Security & Fraud Preventiob 5.1: 11, American Bankers Association, Proquest Document Id: 212152679, Jan. 1998.

* cited by examiner

| 202 | 204 | 206 | 208 | 210 |
|---|---|---|---|---|
| ID | Main Display | Authenticated Display | Auth. Data | Certificate Data | Security Requirements |
| a | Sew Goods<br>Janet Doe<br>Tailor<br>221B Butcher St.<br>BlipCity, AA | [] | [] | [] | [] |
| b | Jane Doe<br>Strategic Projects Team<br>Expires 11/21/2021 | [QR code] | [batterystaple] | [] | Fingerprint |
| c | Widget World<br>Jane Doe<br>Tinker<br>1407 Baker St.<br>Urbia, MM | Username: jdoe<br>Password: correcth0rse | [Jdoe]<br>[correcth0rse] | [] | [] |
| d | Agent 1138 | Transmitting Credentials... | [62 61 74 74 65 72 79 20 73 74 61 70 6c 65] | Nexus PKI Cert | Facial Scan |

FIG. 4

SECURE ACCESS TOKEN DEVICE WITH BIOMETRIC AUTHENTICATION AND RELATED METHODS

RELATED APPLICATION

The present application claims the benefit of U.S. Provisional Application No. 63/383,329 filed Nov. 11, 2022 and is a continuation-in-part of application Ser. No. 17/650,253 filed Feb. 8, 2022, which is a continuation-in-part of application Ser. No. 15/733,702 filed Sep. 30, 2020, now U.S. Pat. No. 11,282,071, which is a national stage application of International Application No. PCT/US2019/064029 filed Dec. 2, 2019, which claims the benefit of U.S. Provisional Application No. 62/773,725, filed Nov. 30, 2018, the content of these applications is hereby incorporated by reference in its entirety herein.

TECHNICAL FIELD

The present disclosure relates to the field of secured access, and, more particularly, to an authentication token and related methods.

BACKGROUND

It is common for a single person, or user, to be associated with multiple roles or personas across various networks and organizations. Each of these "identities" can also change over time as a user moves between roles, undertakes a name change, or leaves or newly joins an organization. Users must manage each of these identities both to interact with other individuals, as well as to gain authenticated access to secured systems or data.

Traditional methods of exchanging identity information can be costly to the user, as well as to recipients of the information. In many interactions where identifying information is shared to advance an interaction, individuals may incur significant real opportunity costs in terms of time, forgone resources, available carrying capacity, and quality of the interaction.

One such example is the interaction among individuals in a professional setting where contact information would ideally be distributed so that the recipients can have a tangible reminder of the identity of the host. Traditionally, this function has been served by the distribution of business cards. Individuals, however, have a limited carrying capacity for business cards, even if they can accurately anticipate the roles and persons that they may want to provide identity information for. Because of this limited carrying capacity, users can be forced to either forgo further interactions or provide a less effective, less memorable, and thereby a lower quality interaction when the number of possible interactions is greater than the number of available identifying credentials.

To further elaborate on this example, consider a situation where a first individual, Person 1, is the host of a meeting or other function that requires introductions via professional identifying credentials, or business cards. At this meeting, interactions that result in an exchange of business cards can be high quality interactions. For logistical reasons, Person 1 may be limited to carrying n cards.

During the meeting, Person 1 can succeed in high quality interactions with n individuals, by providing a card to each. However, the n+1th interaction will be lower quality because Person 1 will be without a business card to provide. This lower quality interaction may require resorting to a lengthier process for exchanging information (such as writing down an email address or phone number), using a less tangible method of exchanging identifying information, or may even forgone by Person 1 altogether. Even successful, high-quality interactions can incur significant costs in terms of time because of the need to sequentially introduce and distribute his credentials to each of n individuals. Each attendee further has a limited carrying capacity for the business cards of others. If Person 1's carrying capacity for other business cards is also equal to n, Person 1 may need to refuse a proffered card from n+1th interaction.

In addition to contact information, users often also need to carry or manage multiple other forms of identification, both physical and electronic. For example, users may need to manage driver's license cards, security badges or other identification cards, one-time password generators for multi-factor authentication, payment information, and the like. Similarly, users often have multiple identities having differing login credentials across systems. This problem can be multiplied for users who have authenticated access to systems across multiple organizations. Generally, each organization to which a user has physical access will issue a badge, key card, or other device intended to be reviewed or scanned upon access to a facility. Such users therefore may need to carry a significant stack of physical credentials to access facilities and systems daily.

While multiple identification management technologies are known, they are unable to mitigate the problems posed by the need to securely store and transmit identification information. From a contact management perspective, while an individual can create multiple business cards, each for a different organization or role, these cards must be managed and physically distributed. Similarly, while contact management software applications exist, these may require the sender and recipient to be using similar or compatible technology to facilitate an exchange.

Security and authentication may also be a problem with existing systems. Password managers can ease the burden of recalling and entering disparate login credentials, but these systems cannot provide a second factor of authentication, such as a one-time password. Furthermore, the use of password managers and authenticator applications may create a risk of unauthorized access to sensitive data.

SUMMARY

Generally, a secure access token device comprises a portable housing, a battery carried by the portable housing, a biometric input device carried by the portable housing and configured to generate biometric data of a user, a status visual indicator carried by the portable housing, a radio frequency (RF) antenna carried by the portable housing, a memory carried by the portable housing, and a processor. The processor is carried by the portable housing and coupled to the battery, the biometric input device, the status visual indicator, the RF antenna, and the memory. The processor is configured to store a plurality of unique tokens in the memory for accessing respective different secured resources, determine a selected unique token from the plurality of unique tokens based upon an additional input on the biometric input device, and transit via the RF antenna an RF signal based upon the selected unique token when the biometric data matches an authentic biometric data template.

In some embodiments, the additional input may comprise a tap input on the biometric input device. The additional input may comprise a swipe input on the biometric input device. Also, the processor may be configured to store the authentic biometric data template in the memory. The processor may be configured to activate the status visual indicator when the biometric data matches the authentic biometric data template. Additionally, the biometric input device may comprise a fingerprint scanner, for example.

In some embodiments, the secure access token device may also include a display carried by the portable housing and coupled to the processor. The processor may be configured to generate a user interface on the display for rendering the selected unique token from the plurality of unique tokens. The processor may be configured to store a plurality of identification records in the memory, each identification record comprising visual identification data, and generate a user interface on the display to render the visual identification data of a selected identification record of the plurality of identification records. The user interface switches between the visual identification data of the selected identification record rendered in a first user-readable format and a second machine-readable format based upon the biometric input device.

Another aspect is directed to a method for making a secure access token device. The method comprises coupling a battery to be carried by a portable housing, coupling a biometric input device to be carried by the portable housing and configured to generate biometric data of a user, and coupling a status visual indicator to be carried by the portable housing. The method also includes coupling an RF antenna to be carried by the portable housing, coupling a memory to be carried by the portable housing, and coupling a processor to be carried by the portable housing and to the battery, the biometric input device, the status visual indicator, the RF antenna, and the memory. The processor is configured to store a plurality of unique tokens in the memory for accessing respective different secured resources, determine a selected unique token from the plurality of unique tokens based upon an additional input on the biometric input device, and transit via the RF antenna an RF signal based upon the selected unique token when the biometric data matches an authentic biometric data template.

BRIEF DESCRIPTION OF THE DRAWINGS

FIG. 4 is a schematic view depicting sample identification records, according to an embodiment.

DETAILED DESCRIPTION

Figure 1:
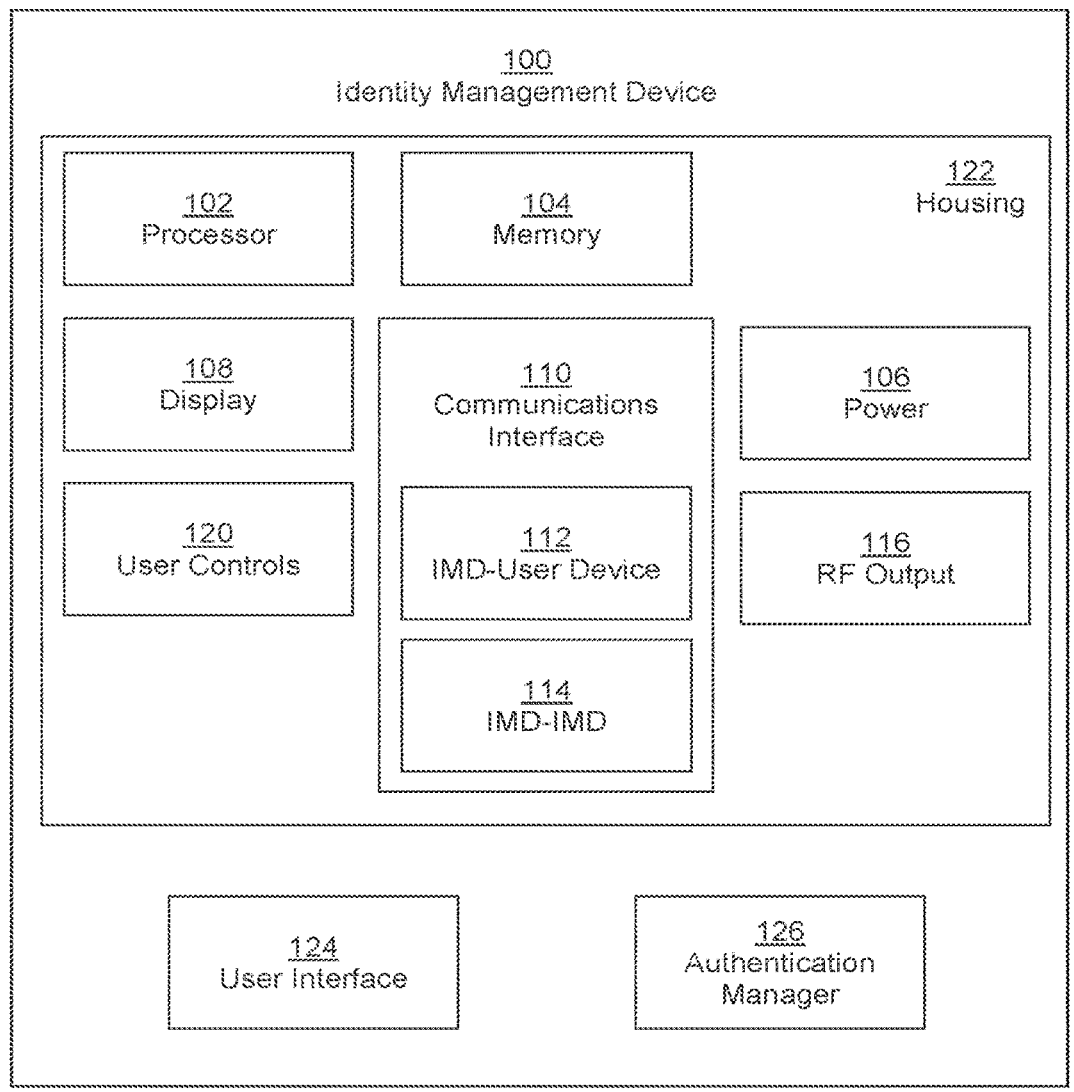
FIG. 1 is a schematic view depicting components of an identity management device, according to an embodiment.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

FIG. 1 is a schematic view depicting components of an identity management device 100, according to an embodiment. Identity management device 100 can comprise processor 102, memory 104, power supply 106, display 108, communications interface 110 and user controls 120. The components of identity management device 100 can be operationally coupled via a bus or other mechanism known in the art (not shown).

Processor 102 can comprise one or more microprocessors or central processing units (CPU) configured to carry out the instructions of a computer program. While identity management device 100 can comprise volatile memory, memory 104 comprises non-volatile memory, such as flash memory, configured to provide a data store for various records and data elements as discussed herein. Power supply 106 can comprise a rechargeable internal power source such as a battery, and/or external power sources as can be provided via one or more external ports, such as a universal serial bus (USB) port. In embodiments, power supply 106 can support charging an internal battery via an external port, or inductive or other wireless charging techniques.

Display 108 can comprise an LCD (liquid crystal display), CRT (cathode ray tube), electronic paper (or electronic ink, also known as e-ink) display. Display 108 can produce black and white, grayscale, or color images.

Referring again to FIG. 1, identity management device 100 communications interface 110 can comprise one or more physical communication mechanisms, including wired connections (via universal serial bus (USB), serial (RS-232), parallel, or other ports, not shown), or wireless connections (via Wi-Fi, BLUETOOTH, BLUETOOTH low energy, ZIG-BEE, Z-WAVE, near field communication (NFC, as described in the ECMA-340 and ISO/IEC 18092 standards) or other wireless connection standards or protocols). Communications interface 110 can provide one or more logical interfaces such as user device interface 112 and identity management device (IMD) interface 114. Each logical interface may enable operative coupling to external devices via one or more of the communication mechanisms provided by communications interface 110. User interface 124 can process inputs from user controls 120, and provide outputs to display 108.

Figure 2A:
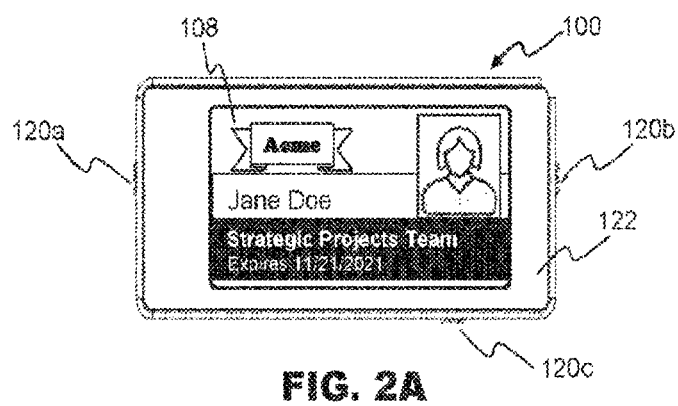
FIG. 2A is a plan view depicting an identity management device, according to an embodiment.
Figure 2B:
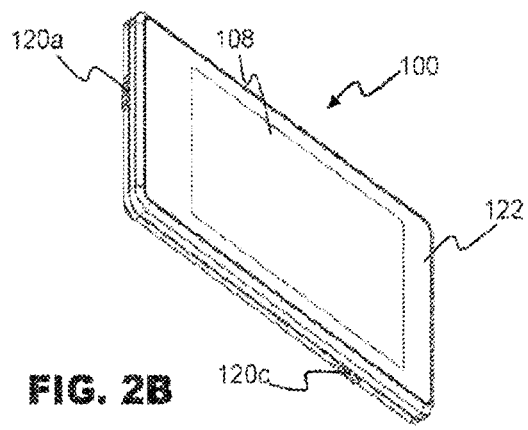
FIG. 2B is a perspective view depicting an identity management device, according to an embodiment.
Figure 2C:
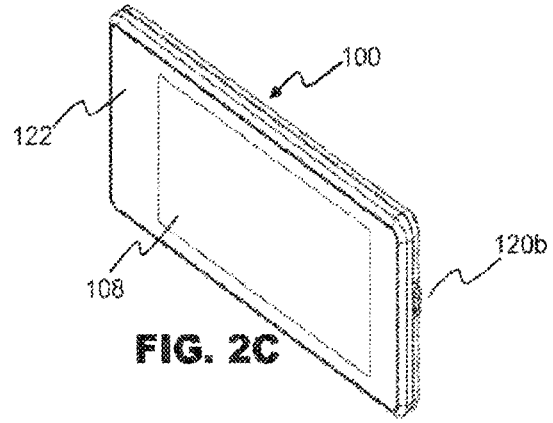
FIG. 2C is a perspective view depicting an identity management device, according to an embodiment.

FIGS. 2A, 2B, and 2C depict external views of identity management device 100. User controls 120 can be present on, through, or within housing 122. User controls 120 can be switches, buttons, touch screen controls, or any other control enabling the user to provide an input to identity management device 100. As depicted in FIGS. 2A-2C, user controls 120 comprise left button 120a, right button 120b, and bottom button 120c. In an embodiment, each of buttons 120a-120c can comprise tactile momentary single-pole single-throw switches. In an embodiment, left button 120a can enable the user to page or flip between identification records or views, right button 120b can enable the user to trigger a data sharing communication, and bottom button 120c can be used to toggle identity management device 100 from an ON state to an OFF state.

In embodiments, more or fewer user controls 120 can be provided. For example, in embodiments, user controls 120 can comprise an optical sensor such as a camera, fingerprint scanner, or other sensors capable of detecting biometric data of a user. In embodiments, user controls 120 can comprise a keyboard and/or one or more external ports for connecting a keyboard or other user interface device. In still other embodiments, user controls 120 can comprise an accelerometer, such that the orientation and movement of identity management device 100 can be detected.

Housing 122 can be a casing enclosing internal components of identity management device 100. Housing 122 can comprise one or more materials that can be plastic, metal, wood, or other non-conformable materials. Housing 122 can comprise one or more layers of water-resistant materials. While housing 122 can have a range of dimensions, in embodiments housing 122 can have a height of about 2.75 inches or 70 mm, a width of about 4 inches or 100 mm, and a depth of about one quarter inch or 6.35 mm. These dimensions can permit display 108 to depict an image of a standard credit card, business card, or security identification card at a 1:1 size ratio, without scaling or cropping, though other sizes can be supported via zoom, scaling, cropping, or other operations. As depicted in FIG. 2A, display 108 can depict an identification record 200, discussed in more detail below.

Figure 3:
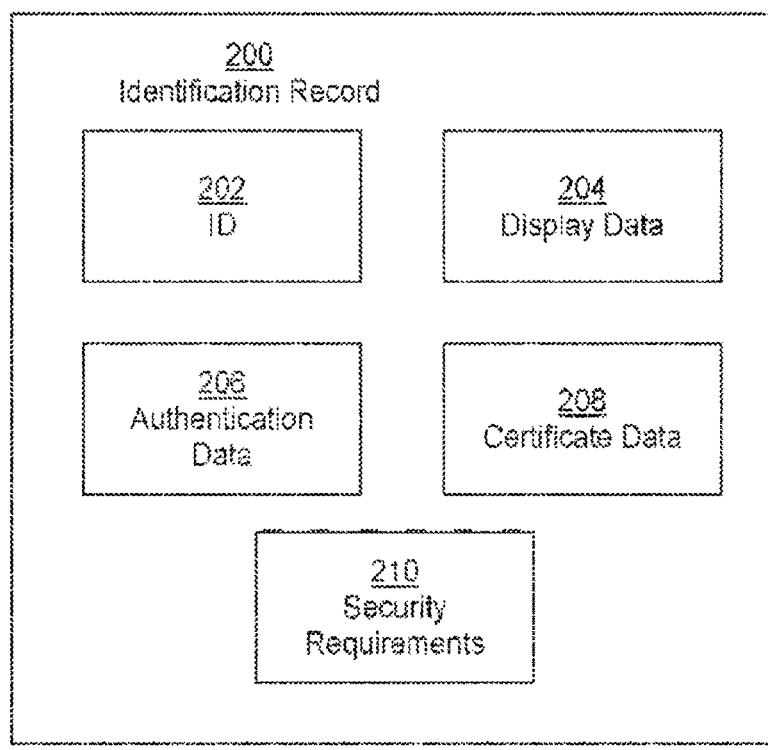
FIG. 3 is a schematic view depicting elements of an identification record, according to an embodiment.

FIG. 3 is a schematic view depicting data elements of an identification record 200 that can be stored in memory 104, according to an embodiment. Identification record 200 can comprise both public and secured data elements. Identification record 200 can comprise an ID 202, which can be a globally unique identifier, serial number, or other data element uniquely identifying the identification record 200. Display data 204 can comprise one or more images for depiction on display 108 in associate with the identification record 200. The image data can comprise two-dimensional image data in vector or raster formats such as, for example, portable network graphics (PNG), scalable vector graphics (SVG), tagged image file format (TIFF or TIF), or the like. The image data can further comprise video or animated images such as graphics interchange format (GIF), WebM, Matroska (mkv), or other format for time-sequenced images. In embodiments, the image data can comprise three-dimensional image or video formats for depiction on a holographic display.

Display data 204 can further comprise renderable data for depiction on display 108. For example, display data 204 can comprise text data (such as raw text, or HTML), and/or formulas, scripts, or other instructions for calculating the image to display. Display data 204 can further comprise a plurality of discrete data elements associated with identification record 200. These data elements can include contact information such as name, organization, phone numbers, email addresses, payment information, and the like.

Identification record 200 can further comprise authentication data 206, which can include information to be sent electronically to one or more external devices via communications interface 110. Authentication data 206 can comprise usernames, passwords, personal identification numbers (PIN), secret keys, or other authentication data required to facilitate access control. Authentication data 206 can be secured data within identification record 200 such that authentication data 206 is not displayed or transmitted without user authentication and authorization.

In embodiments, display data 204 can be generated based on authentication data 206. For example, authentication data 206 can comprise a secret key for generation of hash-based message authentication code (HMAC)-based One-Time Passwords (HOTP), such that identity management device 100 can display one-time passwords to facilitate multi-factor authentication schemes. Authentication data can also comprise secret keys or other information for the rendering of one-dimensional barcodes, two-dimensional, or matrix bar codes (such as QR CODE codes), or other image optimized for computer scanning and/or machine readability. In embodiments, display data based on authentication data can be secured data within identification record 200.

Certificate data 208 can comprise public keys, challenge-response protocols, or other requirements that can be used to ensure that the external device requesting authentication data 206 is one that has been authorized to receive authentication data 206.

Security requirements 210 can comprise data, flags, or other instructions regarding any security protocols to be enforced by authentication manager 126 before displaying or sending some or all of the data within each identification record 200. For example, in embodiments, a security requirement 210 can require proof of user identity before displaying secured data, such as a matrix bar code associated with an identity. Proof of user identity can be provided via fingerprint scanner, facial recognition, inputs of codes or sequences via user controls 120, an authorization from a paired user device, or other methods. Authentication manager 126 can verify that certificate data 208 is provided and security requirements 210 are met before enabling the display or transmission of data elements within identification record 200.

Identification records 200 in various embodiments can include more, fewer, or alternative data elements to those depicted and described herein. In embodiments, all or portions of identification records 200 can comprise data in a virtual contact file (VCF, or vCard) format. In embodiments, identification records 200 can be converted to a virtual contact file, or other standard format, prior to transmission.

FIG. 4 is a table view depicting multiple identification records 200 as might be stored in memory 104. While the table of FIG. 4 is depicted in grid format for the purposes of this example, memory 104 can store identification records 200 in any data storage format. For example, memory 104 can comprise a relational database, non-relational database, flat text files, binary files, or any combination thereof. As depicted in FIG. 4, display data 204 for each identification record 200 can include a main display and an authenticated display, which can be depicted after any security requirements 210 have been met by the user. For example, as depicted in the record with ID 202a, only a main display is provided. This identification record is an example of a contact-information only record. No security or authentication data 206 is provided, and no authenticated display is required.

As depicted in the record with ID 202b, a fingerprint scan is required by security requirements 210 before a QR code is displayed. In this case, the QR code can be generated based on the authentication data 206, reading "batterystaple". In ID 202c, no security requirements are provided, so the username and password can be provided on the authenticated display. In ID 202d, security requirements 210 require a facial scan, and certificate data 208 requires a public key infrastructure (PKI) certification key to be verified, before the string provided in the authentication data 206 is transmitted. As can be seen, therefore, each identification record 200 can record contain disparate identity and security elements, enabling different tiers or levels of security for each identification record 200 stored.

Identification records 200 can be stored entirely or partially in an encrypted format (data-at-rest encryption). The decryption key can be provided by entry through user controls 120, through connection to an external device, or can be stored in a separate hardware or software component of identity management device 100. In embodiments, each identification record 200 can have separate decryption keys, based on, for example, security requirements 210. Identification records 200 can also be encrypted prior to transmission to or from identity management device 100 (data-in-transit encryption). Encryption of data-at-rest and data-in-transit can be performed by any encryption scheme known in the art.

Figure 5A:
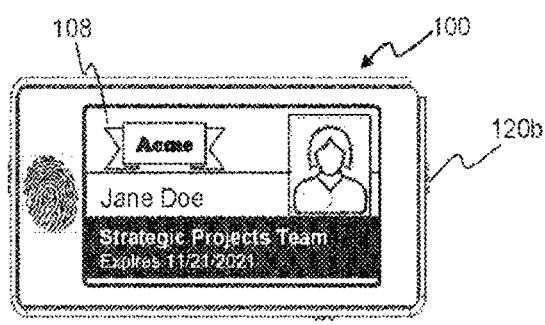
FIG. 5A is a plan view depicting a screen of an identity management device, according to an embodiment.
Figure 5B:
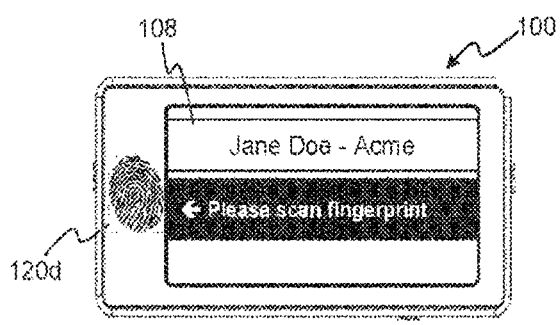
FIG. 5B is a plan view depicting a screen of an identity management device, according to an embodiment.
Figure 5C:
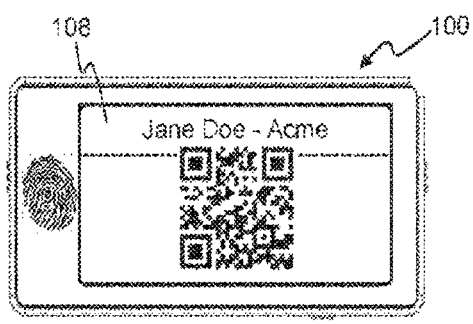
FIG. 5C is a plan view depicting a screen of an identity management device, according to an embodiment.

FIGS. 5A-5C depict a sequence of screens that can be depicted on display 108 to provide both a main display and an authenticated display of data. As depicted in FIG. 5A, a main display of display data 204 can be provided. If the user provides an input, for example by actuating the right button 120b, the screen depicted in FIG. 5B can be displayed. The screen of FIG. 5B can request that the user provide a fingerprint input at user control 120d, which can be a fingerprint scanner. If the provided fingerprint matches security requirements 210 for the associated identification record 200, a QR code can be displayed as depicted in FIG. 5C. Authentication data 206 can also be provided as login credentials such as usernames or passwords on display 108.

In an embodiment, authentication data 206 can be output via RF output 116. RF output 116 can comprise one or more oscillators, filters, and/or other components that can be driven by processor 102 to produce a desired RF signal. RFID parameters can be stored as authentication data 206. The RF signal can be generated to respond to active or passive RFID scanners in response to security challenges. By displaying machine-readable authentication codes 319 via display 108 or producing RFID outputs via RF output 116, identity management device 100 can replicate or replace one or more security identification badges or tags.

Figure 6:
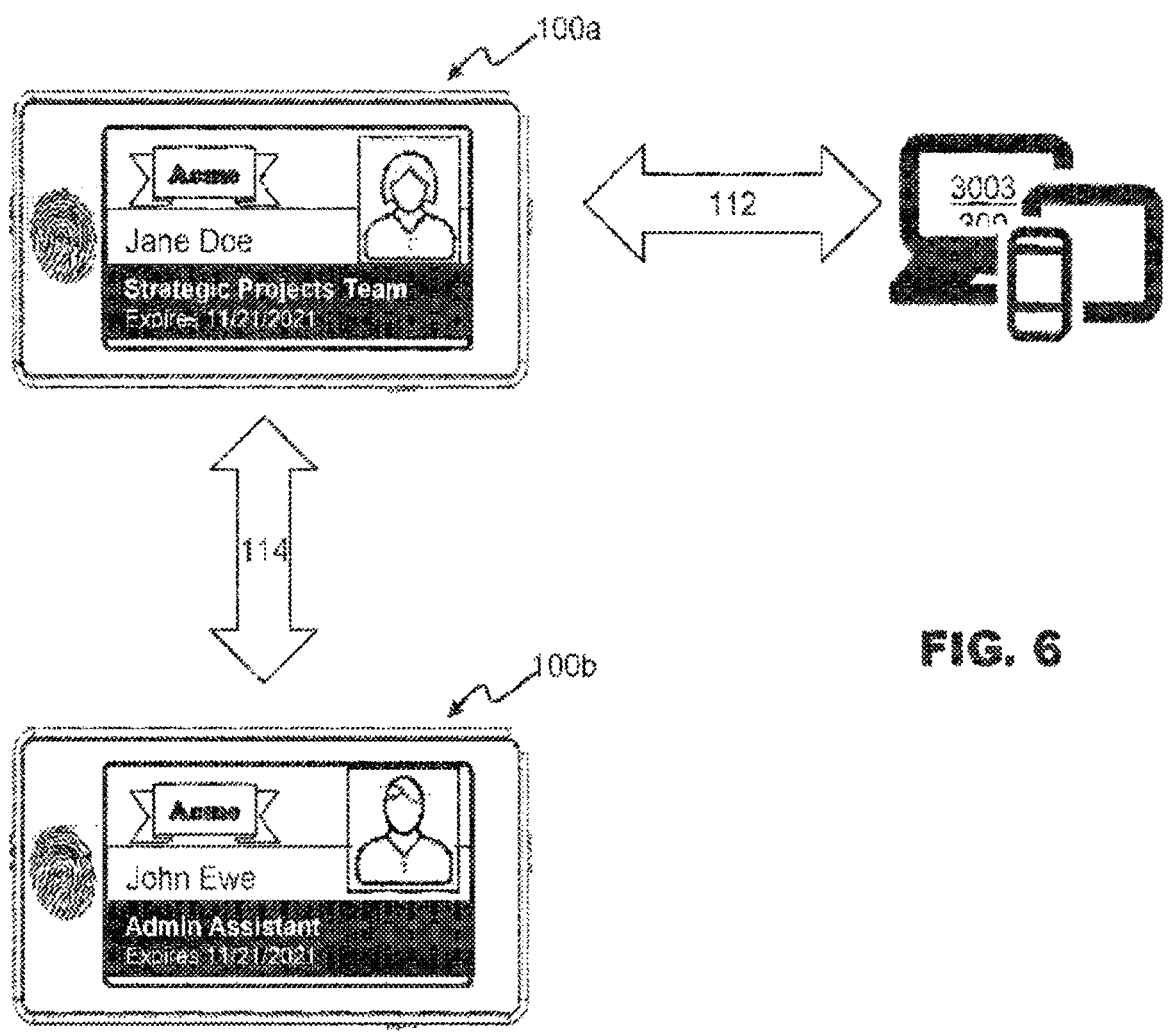
FIG. 6 is a schematic view depicting identification record data flows, according to an embodiment.

As depicted in FIG. 6, user device interface 112 can enable an identity management device 100 (labeled here as identity management device 100a) to be connected, or paired, to one or more user devices 300. User devices 300 can comprise laptop or desktop computers, mobile devices such as smart phones, or other computing devices such as tablets, smart watches, or the like. User device interface 112 can enable the receipt of identification records 200 from user devices 300, the transmission of identification records 200 to user devices 300, commands to send or broadcast identification records 200, and/or authentication credentials to satisfy the requirements of security requirements 210. IMD interface 114 can enable a first identity management device 100a to connect to a second identity management device 100b, to share all or part of identification records 200. In embodiments, only contact information may be shared by default, though sharing of entire identification records 200 including secret data can be provided with appropriate authentication and authorization controls.

Figure 7:
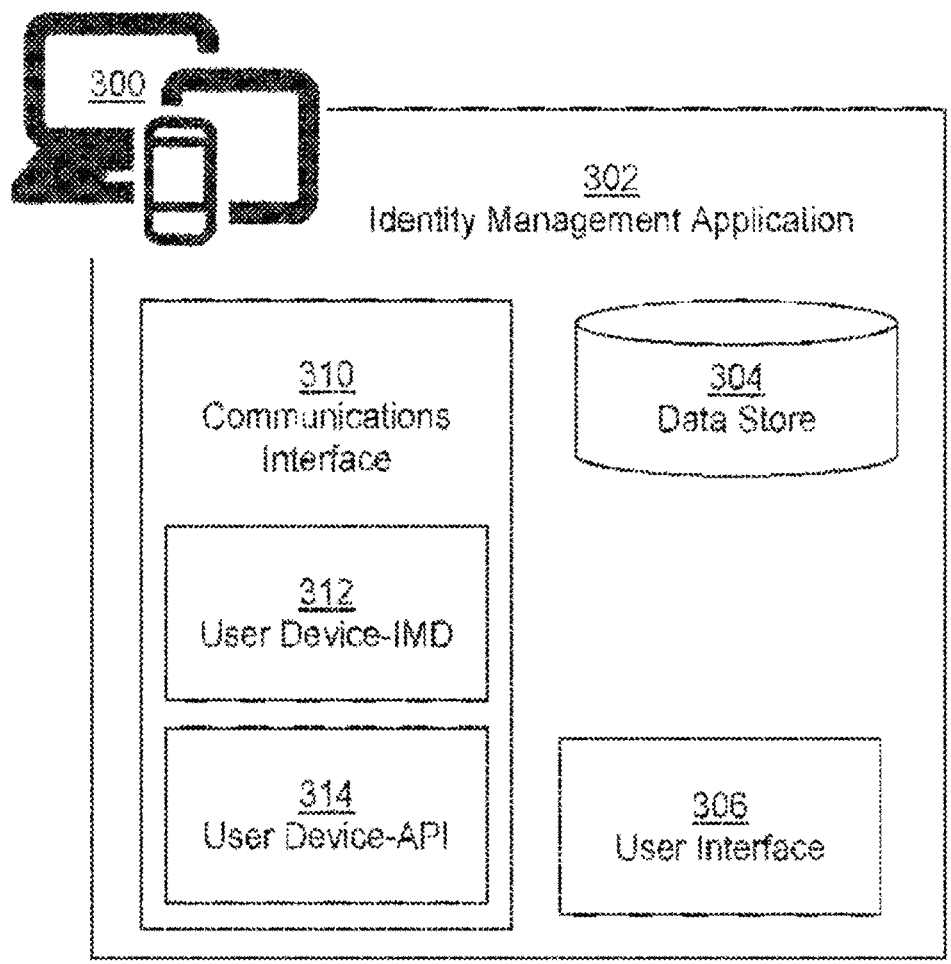
FIG. 7 is a schematic view depicting an identity management application, according to an embodiment.

FIG. 7 is a schematic diagram depicting components of an identity management application 302 that can be provided for execution the computing hardware of user device 300. For the purposes of this disclosure, user device 300 will be used interchangeably with identity management application 302. Application 302 can comprise a data store 304, for storing, within the memory of user device 300, one or more identification records 200, in addition to data related to paired identity management devices 100.

User interface 306 can comprise one or more screens that can be depicted on the display of user device 300 and controls (such as touch screen, graphical user interface (GUI), or command-line entry user interface elements) for receiving user input. User interface 306 can receive user inputs and provide user outputs as provided by application 302. User interface 306 can comprise a mobile application, web-based application, or any other executable application framework. User interface 306 can reside on, be presented on, or be accessed by any computing devices capable of communicating with user device 300, receiving user input, and presenting output to the user.

Application 302 can further comprise communications interface 310, which can use the connection mechanisms provided by user device 300 to provide an IMD interface 312 and Application programming interface (API) interface 314. FIGS. 8A-8G depicts screens of application 302 as may be presented on a mobile phone user device 300, according to an embodiment. The screens of FIGS. 8A-8G will be discussed in more detail below.

Figure 8A:
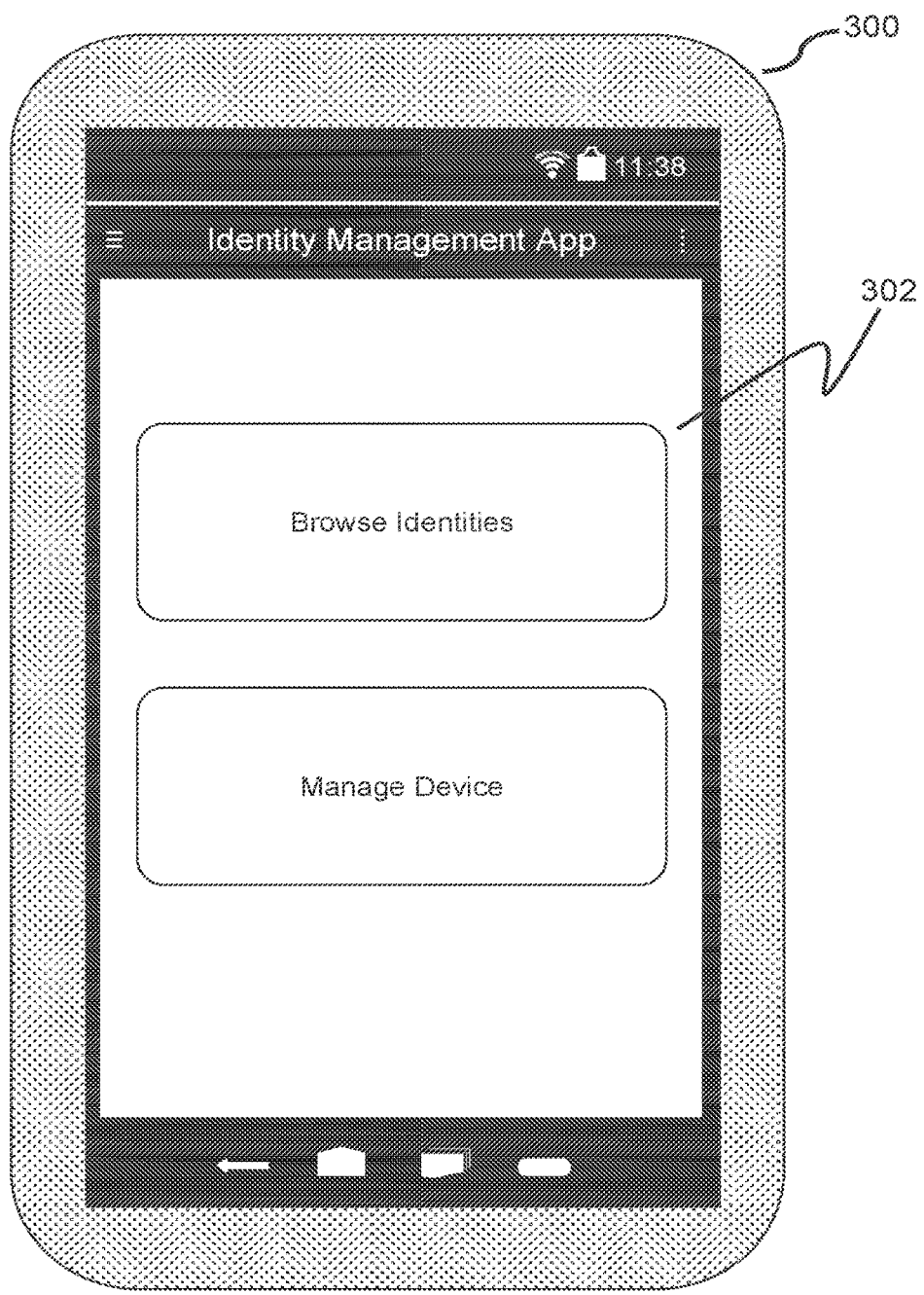
FIGS. 8A-8G are mock-up views depicting screens of an identity management application, according to an embodiment.
Figure 8B:
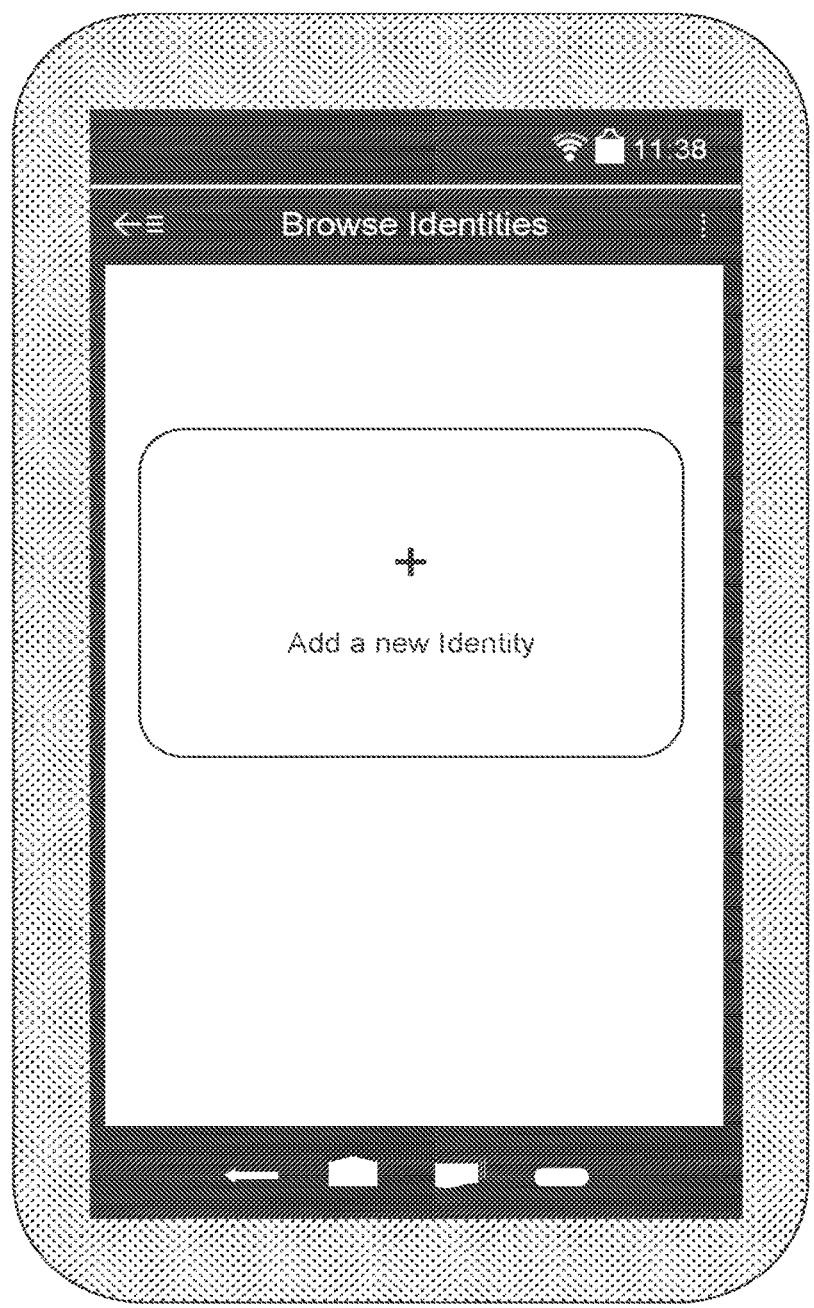
Figure 8B:
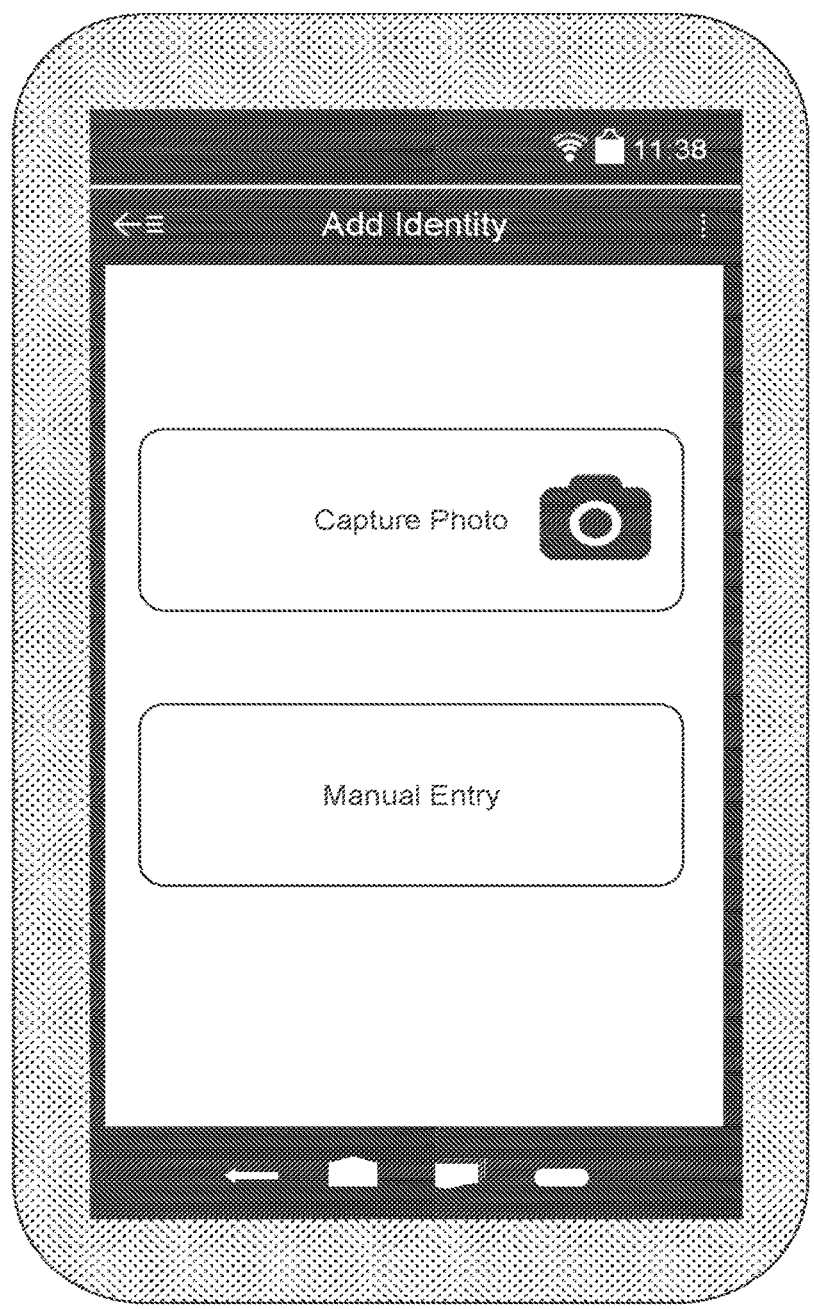
Figure 8C:
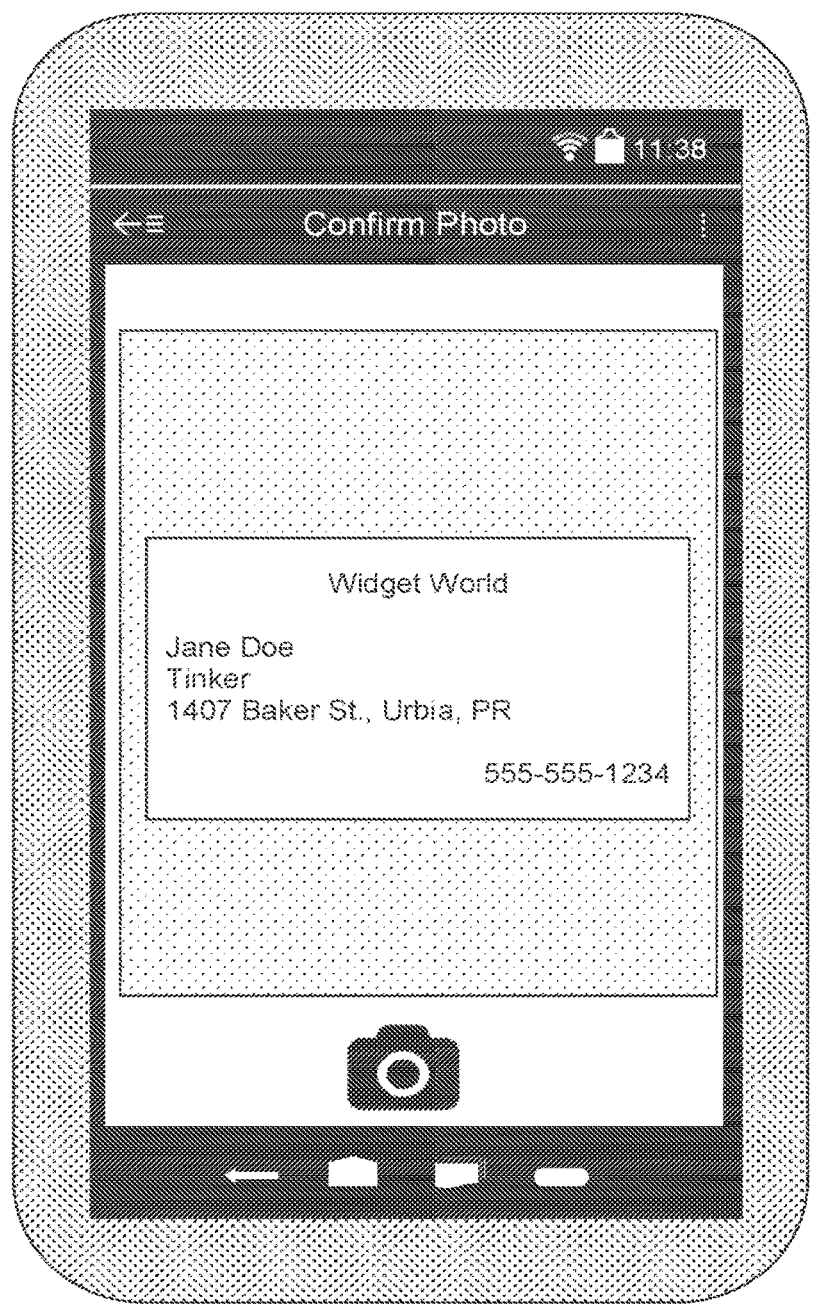
Figure 8D:
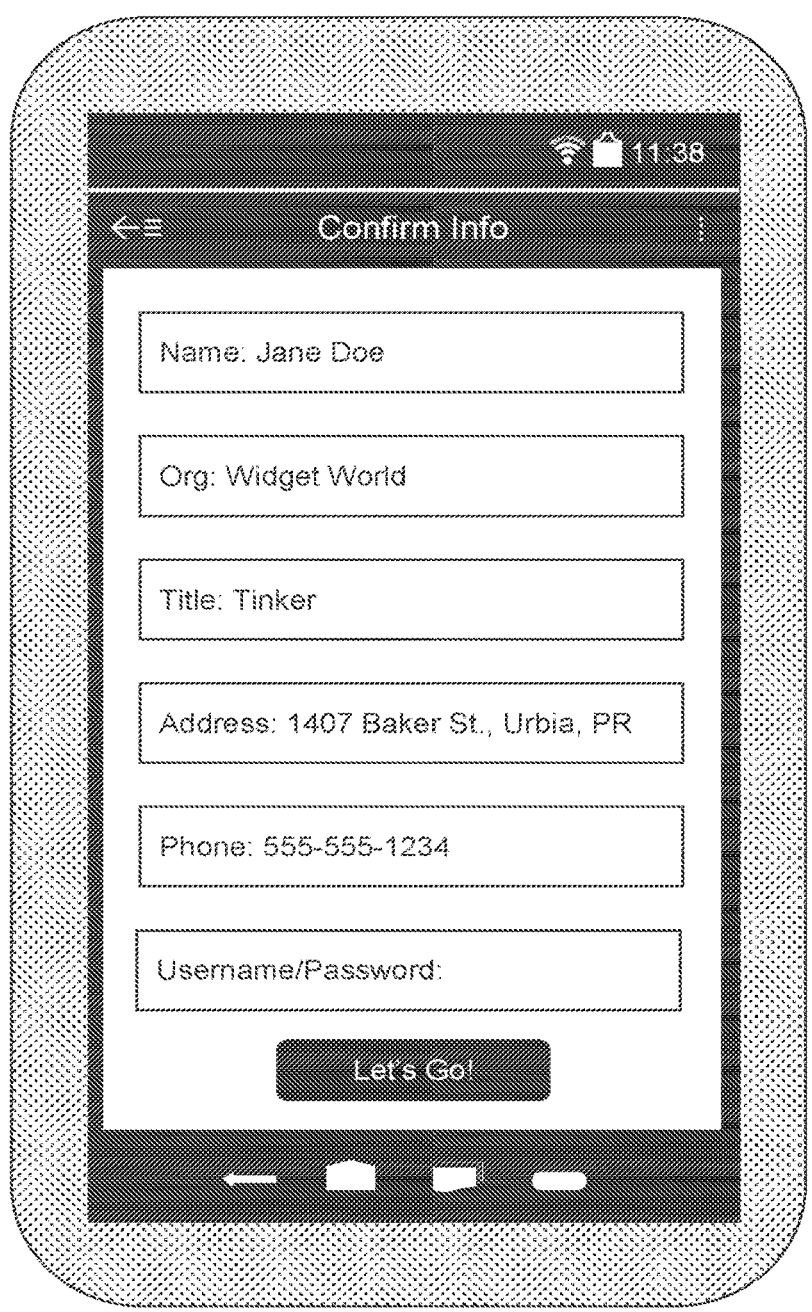
Figure 9:
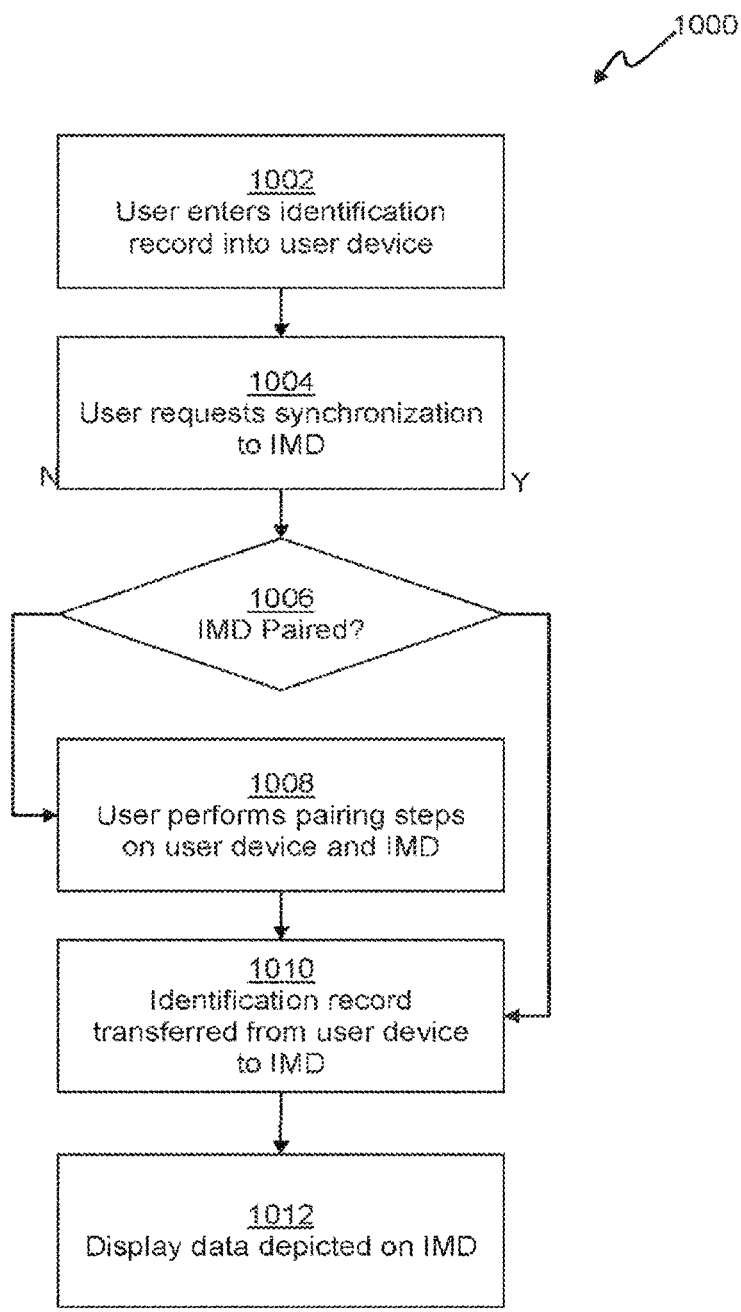
FIG. 9 is a flowchart depicting a method for transferring data to an identity management device, according to an embodiment.

FIG. 9 is a flowchart depicting a method 1000 for loading identification records 200 into memory 104 via user device 300. At 1002, application 302 can present screens such as those depicted in FIGS. 8A through 8D to guide the user through entry of an identification record. In the example screens provided, in FIG. 8A, the user can select to browse identities, and then choose to add a new identity on the screen depicted in FIG. 8B.

Figure 8E:
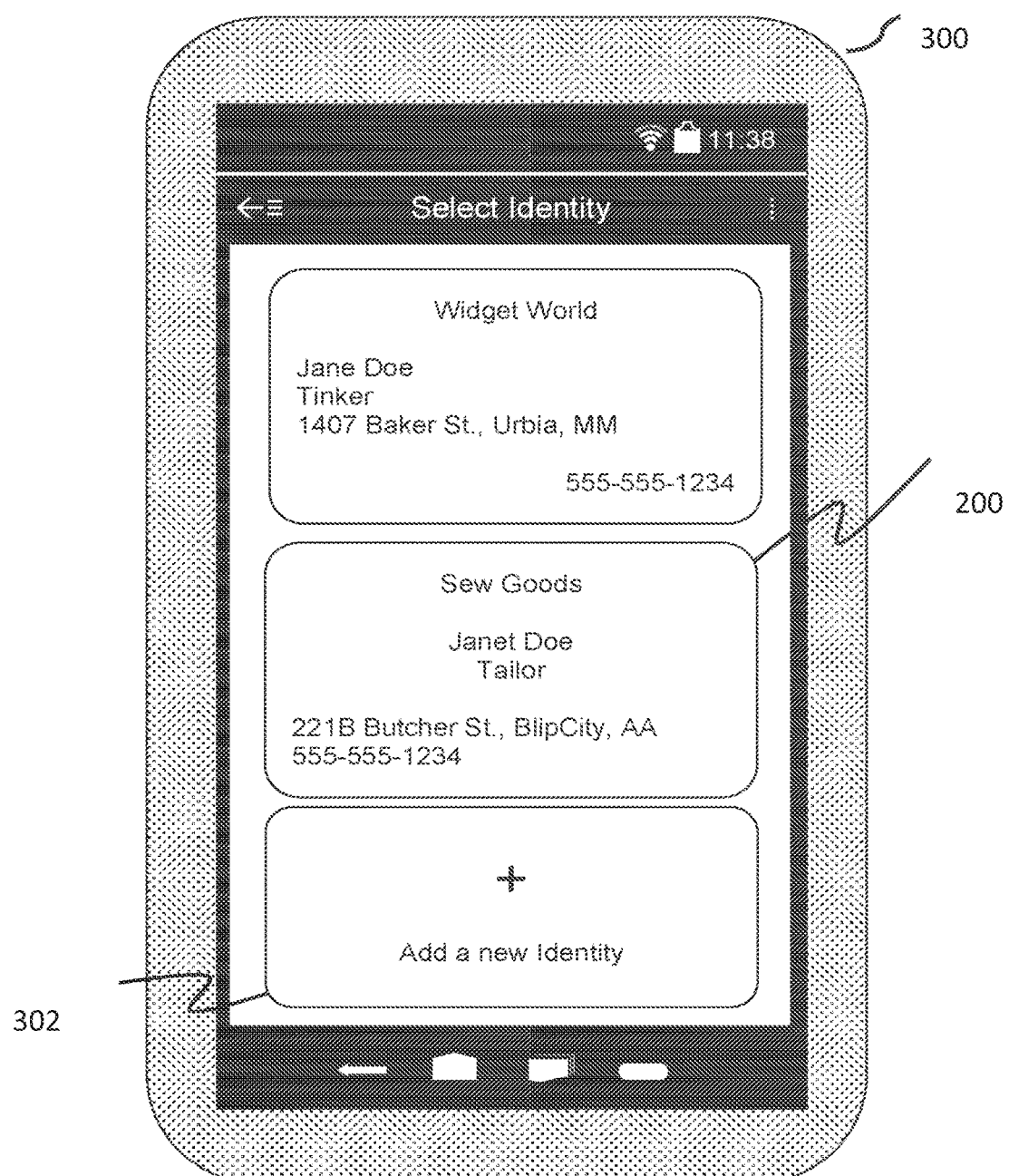
Figure 8F:
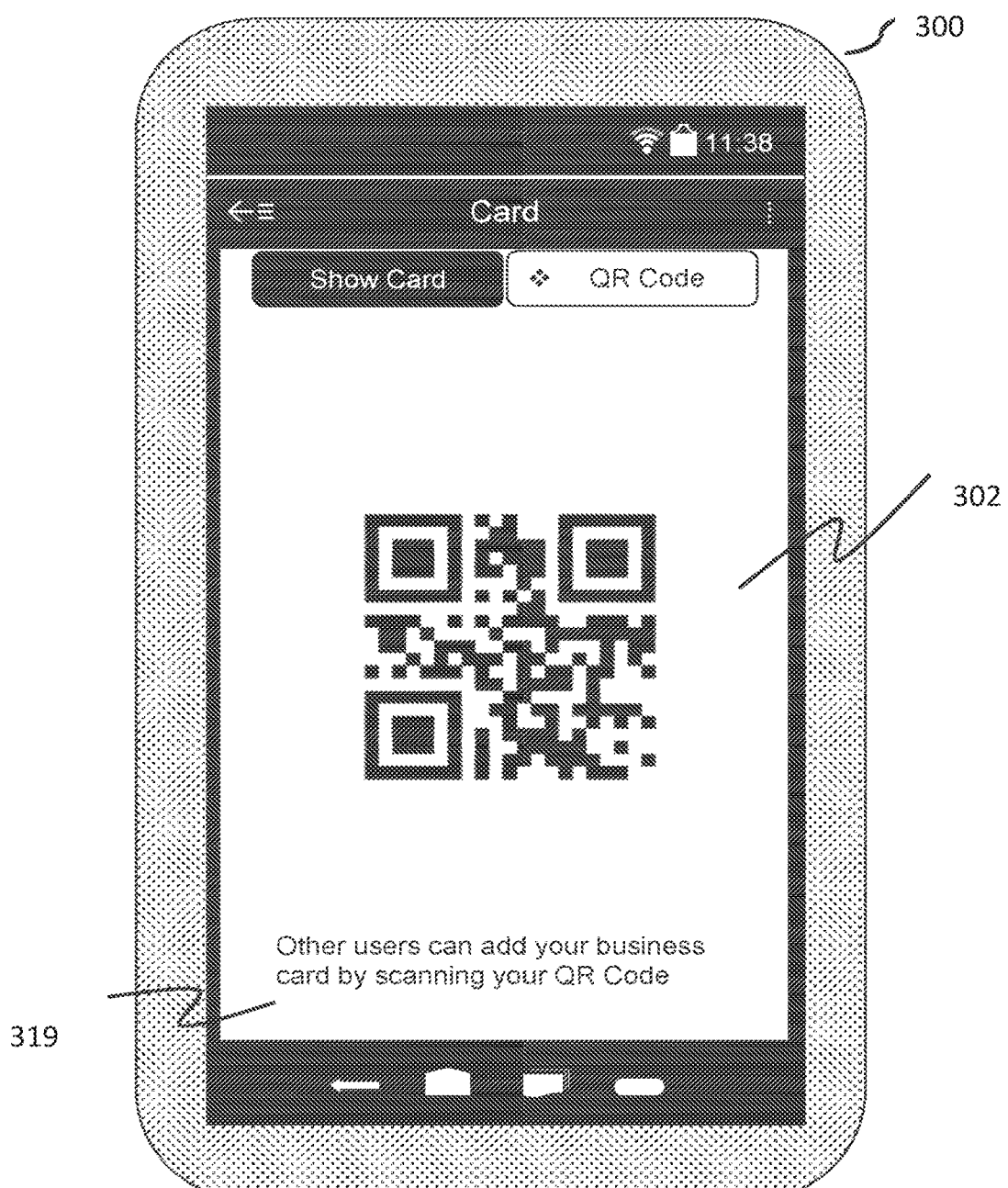
Figure 8G:
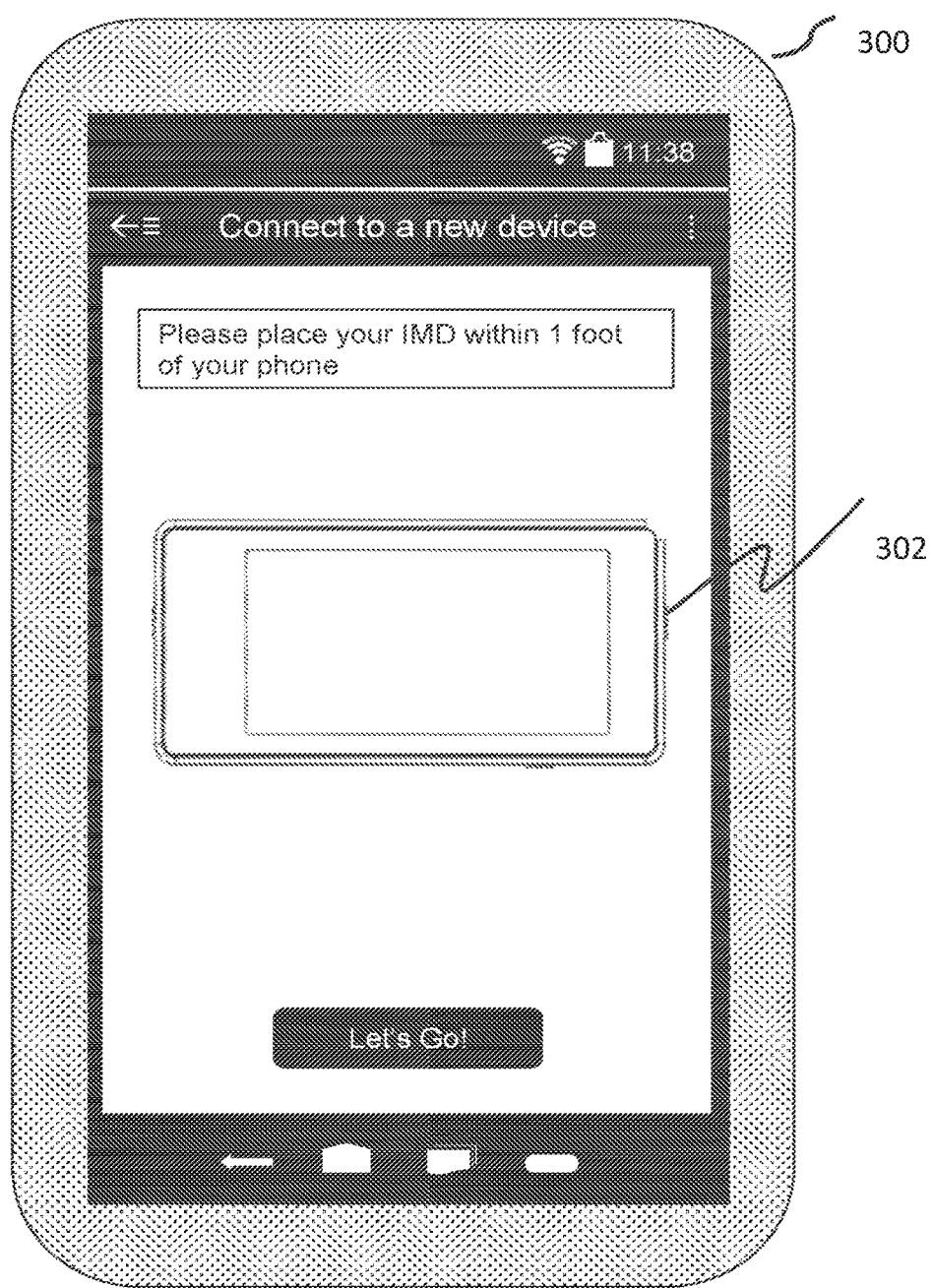

As depicted in FIG. 8C, the application can enable the user to capture identity information by taking a photograph, or via manual entry. In embodiments, other entry methods can be supported such as selecting an image that already exists in memory, voice entry, or the like. Application 302 can enable the user to use the camera functionality of the user device 300 to take a picture including identity information, for example, the front and back of a business card. In embodiments, the application 302 can perform optical character recognition to detect the text in the image, and present the detected text to the user for confirmation in FIG. 8D. In embodiments, machine-learning techniques can be used to train a model to assist in both detecting text data in business card-like formats, and to determine the most likely fields associated with each item of text detected. As depicted in FIG. 8D, the user can be prompted for authentication data 206 (such as username or password) that may not be depicted on a physical identification card. In embodiments, authentication data 206 can also be provided by capturing an image (for example, scanning a matrix bar code associated with a multi-factor authentication scheme). FIG. 8E depicts a screen of application 302 upon which the display data 204 of multiple identification records 200 can be shown to the user.

Returning now to FIG. 9, at 1004, application 302 can enable the user to request synchronization to an identity management device 100. If, at 1006 no devices paired devices are detected within range of the IMD interface 312, the user can be asked to connect to or pair an identity management device 100, via the display of a screen such as that depicted in FIG. 8G at 1008. The range of the IMD interface 312 can be determined based on the communication protocols supported by user device 300 and identity management device 100. For example, NFC communication ranges can be about four centimeters, whereas BLUETOOTH ranges can be significantly larger, up to about 77 meters.

After the connection is made, the identification record can be transferred from the user device to identity management device 100, for storage in the memory 104 at 1010. Identification records 200 can be encrypted in transit or sent via plaintext, in embodiments.

At 1012, the identification record 200 can be depicted on display 108, for viewing on identity management device 100. While method 1000 is described with respect to a single identification record 200, it should be appreciated that synchronization can involve the transfer of any number of identification records 200 identity management device 100.

Embodiments of the present disclosure provide alternative methods for generating identification records 200 for transmission to identity management device 100. For example, identification records 200, or portions thereof, can be generated by a credentialing entity, such as a government entity or organization. Identification records 200 can be transmitted to the user device 300 through a network connection or any other data transfer means. Application 302 can access an identification record 200 selected by the user by, for example, opening a file that exists on user device 300, or by connecting to a system using login credentials provided by the user. The retrieved identification record 200 can then be transmitted to identity management device 100 as needed. Embodiments, therefore, can enable credentials such as driver's licenses or security access cards to be generated digitally, and transmitted electronically to the user, in lieu of the printing and distribution of physical identification cards.

Figure 10:
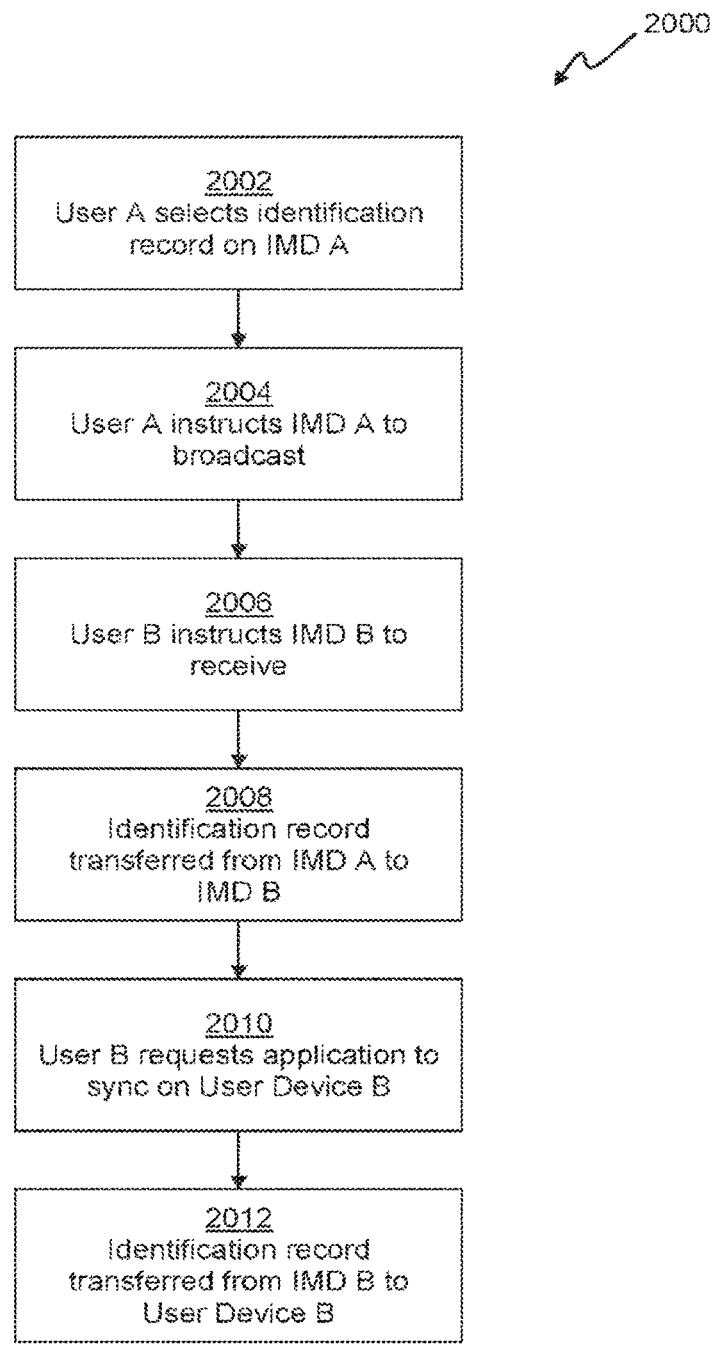
FIG. 10 is a flowchart depicting a method for transferring data between identity management devices, according to an embodiment.

FIG. 10 is a flowchart depicting a method 2000 for transferring contact information from an identification record 200 between a first identity management device (IMD 100a) and a second identity management device (IMD 100a), and onto a user device (300b), according to an embodiment. This method can enable an identity management device 100a to function as, effectively, an electronic business card.

Figure 11A:
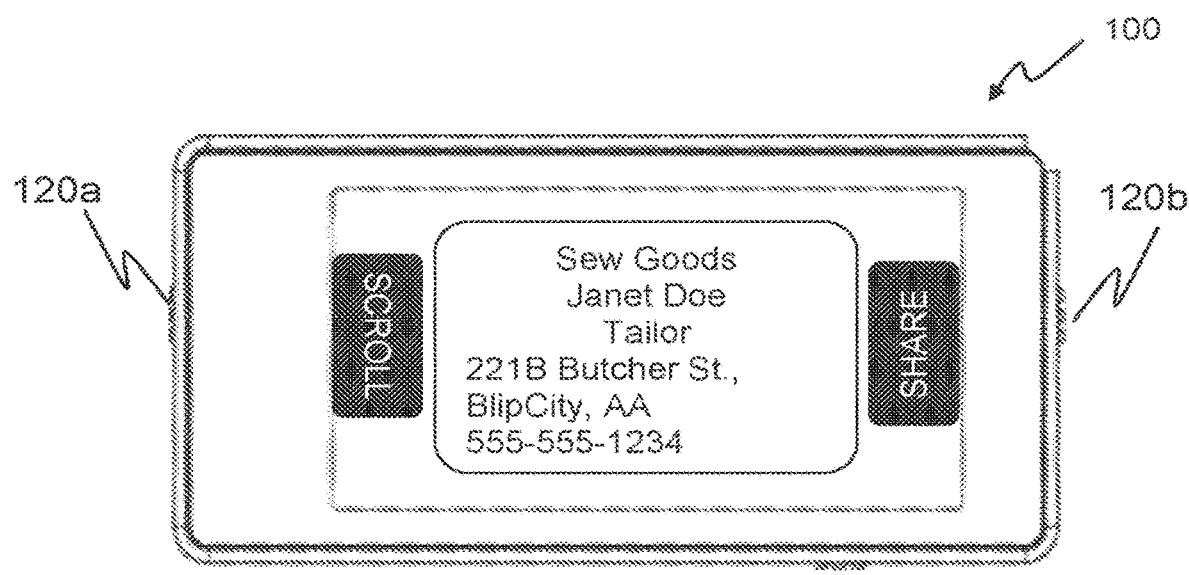
FIGS. 11A and 11B are plan views depicting screens of an identity management device, according to an embodiment.

At 2002, the first user, User A, can select an identification record 200 on IMD 100a. With reference to FIG. 11A, the identification record 200 can be selected by, for example, actuating left button 120a (as depicted in FIG. 11A) repeatedly to scroll or flip through the identification records 200 available in memory 104. At 2004, User A can instruct IMD 100a to share some or all of the display data 204 of the selected identification record 200, by actuating right button 120b in the depicted embodiment.

At 2006, User B can instruct IMD 100b to receive data. In embodiments, identification management device 100 can enter a receive mode automatically upon power on, or user controls 120 can provide mechanisms to enter a receive mode. For example, pressing the right button 120b for a preset period of time can activate receive mode. At 2008, identification record 200 can be transferred from IMD 100a to IMD 100b through the respective IMD interfaces 114 or each identity management device.

At 2010, User B can request that user device 300b perform a synchronization with IMD B. At 2012, the identification record 200 can be transferred to user device B, after pairing and connecting similar to that described with respect to FIG. 9 above.

Figure 11B:
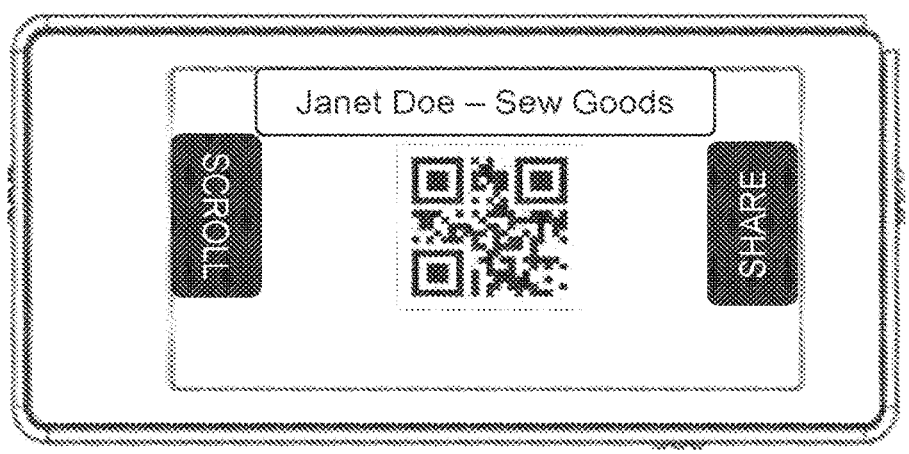
Figure 12:
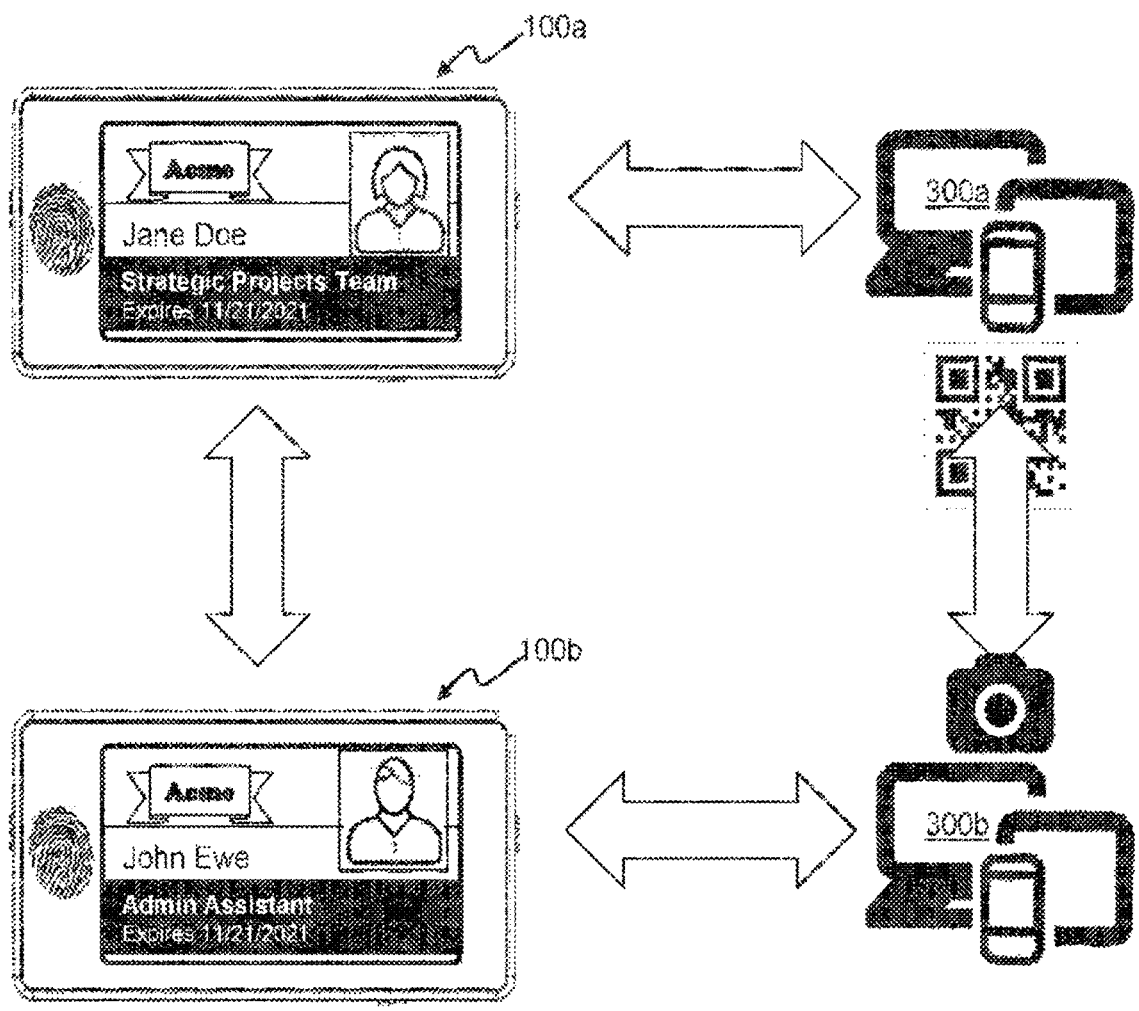
FIG. 12 is a schematic view depicting identification record data flows, according to an embodiment.

As should be appreciated, method 2000 is only one method of transferring contact information between users through the user of one or more identity management devices 100. For example, in embodiments, IMD 100a can present a matrix barcode, or other machine-readable rendering of display data 204, which can be input to application 302b on user device 300b via a camera or other optical sensor. For example, FIG. 11B depicts a machine-readable matrix barcode based on the contact information depicted in human-readable form in FIG. 11B. Further, IMD 100a can present a business card-like view of display data 204, which can be loaded into application 302b on user device 300b through a process similar to method 1000 above. Similarly, in embodiments, contact information can be shared directly through user devices 300a and 300b by display and capture of display data 204. Examples of these data flows are depicted in the schematic diagram of FIG. 12.

Figure 13:
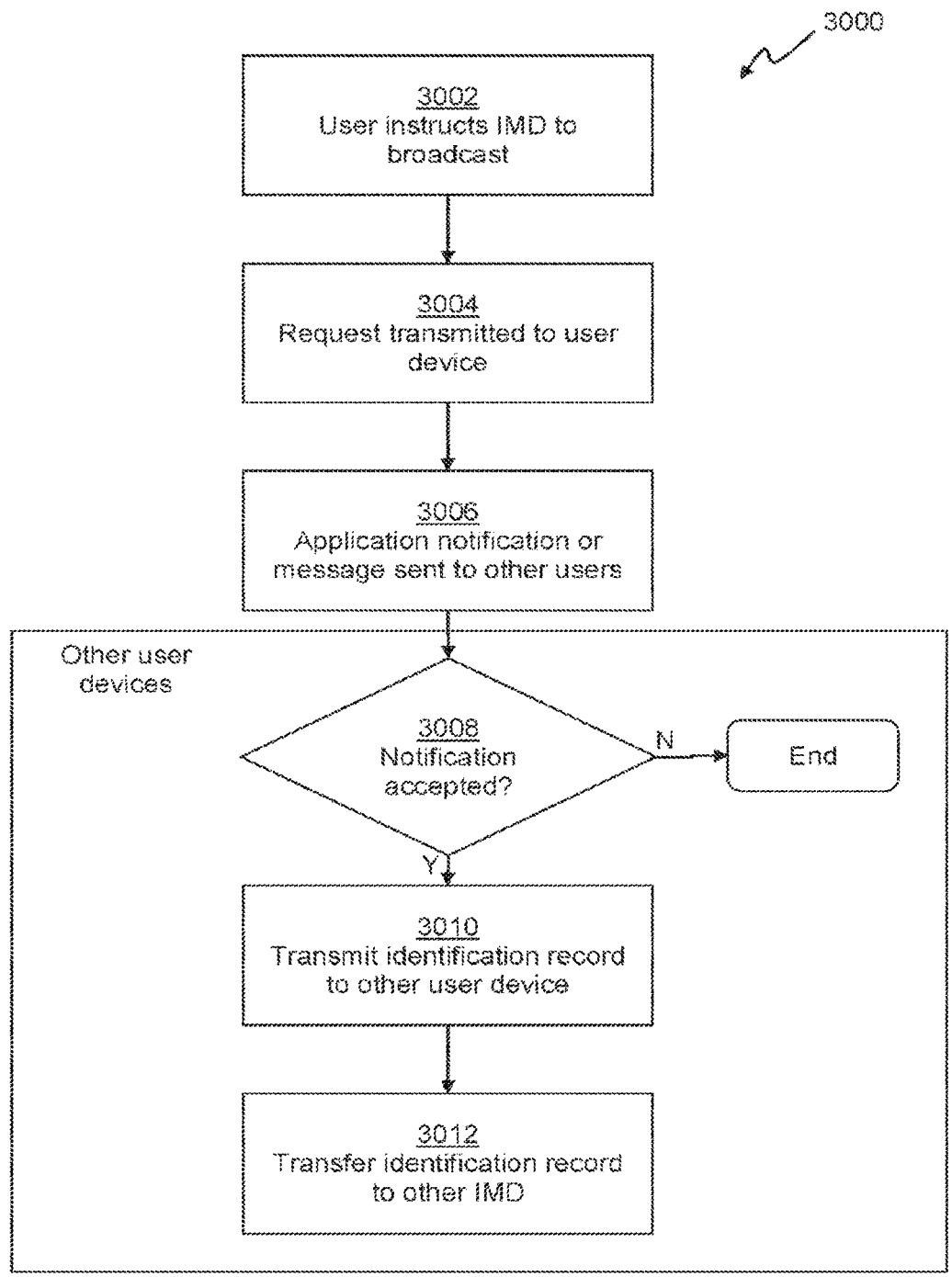
FIG. 13 is a flowchart depicting a method for broadcasting identity data, according to an embodiment.

FIG. 13 is a flowchart depicting a method 3000 using a user device 300 to extend the broadcast range of an identity management device 100. At 3002, the user can instruct identity management device 100 to broadcast, by, for example, actuating one or more of user controls 120. At 3004, identity management device 100 can transmit the broadcast request including identification record 200 to user device 300. Application 302 can then provide a broadcast or narrowcast transmission using the wireless transmission capabilities provided by communications interface 310, for example, over WiFi, or BLUETOOTH. Other user devices 300 executing application 302, or other compatible software, can receive the request to connect and provide an app-directed push notification. In embodiments, application 302 can provide identification record 200 to API 500 for dissemination via email or receive text message to user devices that may not have a compatible application installed.

At 3006, a push notification can be delivered to one or more computing devices associated with other users. The push notification can be presented through application 302, or through a text or other message. If, at 3008, the other user accepts the notification, the information can be transmitted from user device 300 at 3010, otherwise interaction can end. At 3012, if the computing device includes a compatible application 302, the identification record 200 can be transmitted to a second identity management device. Through execution of method 3000, users retain the ability to accept or reject incoming transmissions. Should they accept, the connection between the transmitting external source and the receiving electronic devices can be made and the information can be pushed to the recipients' electronic devices.

Figure 14:
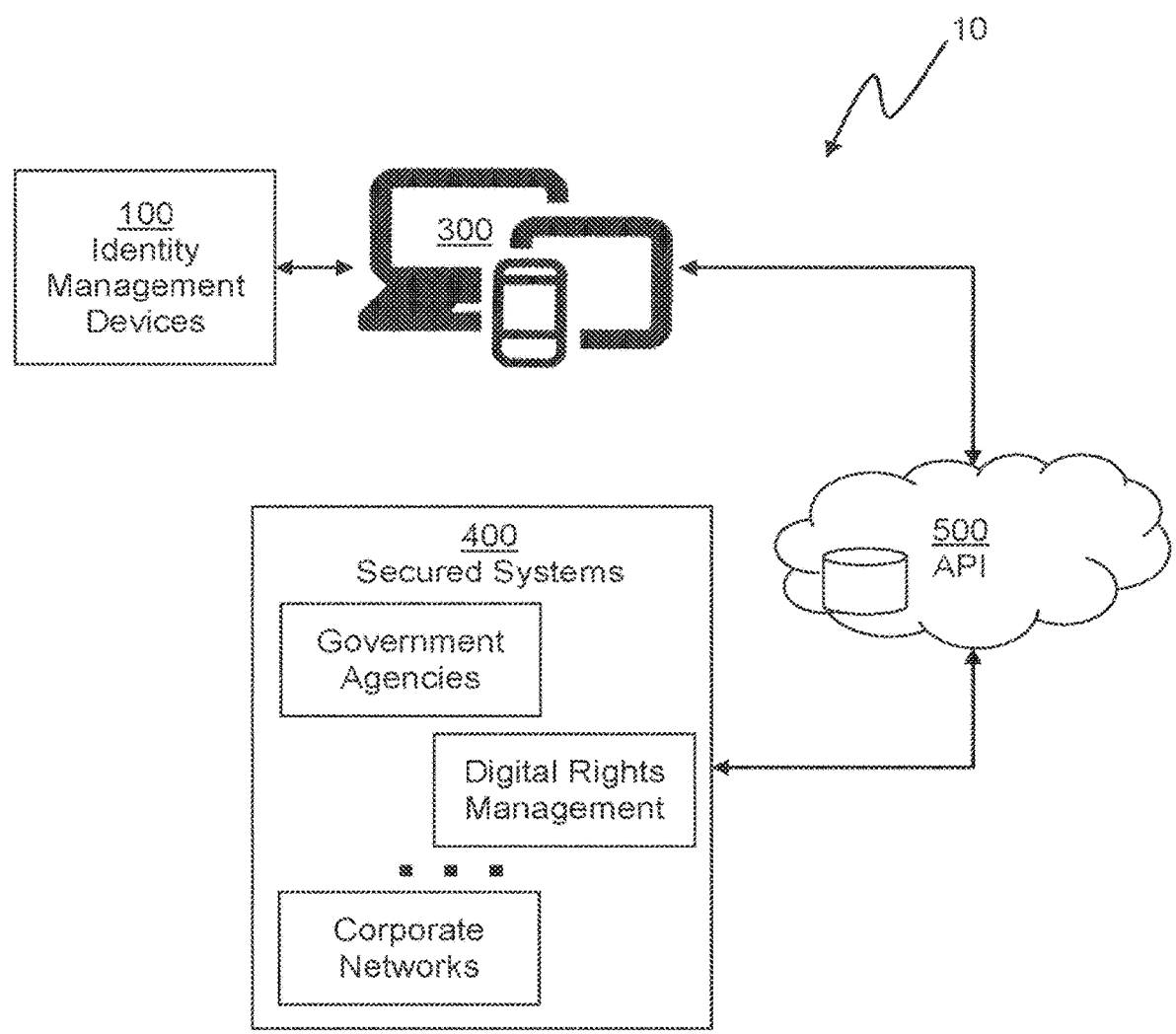
FIG. 14 is a schematic view depicting an identity management system, according to an embodiment.

FIG. 14 is a schematic diagram depicting an identity management system 10, that can comprise a plurality of identity management devices 100 and user devices 300 (though only one identity management device 100 and user device 300 is depicted). System 10 can further comprise one or more secured systems 400, such networks, agencies, buildings, files, digital rights, or other systems, data stores, data structures for which security credentials can be provided. API 500 can provide connectivity between user devices 300 and secured systems 400.

API 500 can comprise application software or instructions for execution on one or more network-connected platforms, such as a cloud computing environment. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can provide various features, such as on-demand self-service, broad network access, resource pooling, rapid elasticity, measured service, or any suitable characteristic now known to those of ordinary skill in the field, or later discovered. Cloud service models can include Software as a Service (SaaS), Platform as a Service (PaaS), Infrastructure as a Service (IaaS). Cloud deployment models can include private clouds, community clouds, public clouds, hybrid clouds, or any suitable service type model now known to those of ordinary skill in the field, or later discovered. Databases and servers described with respect to the present disclosure can be included in a cloud model.

API 500 can enable other external agents or users to configure the data in identification records 200 for provision to user devices 300 and identification management devices 100. For example, API 500 can provide a data store including dynamically updated authentication data 206 that can be provided to application 302 and/or identity management device 100. API 500 can also provide, verify, or authenticate certificate data 208 as requested to ensure that authentication data 206 is provided only to those systems and services that are authorized to receive it.

Figure 15:
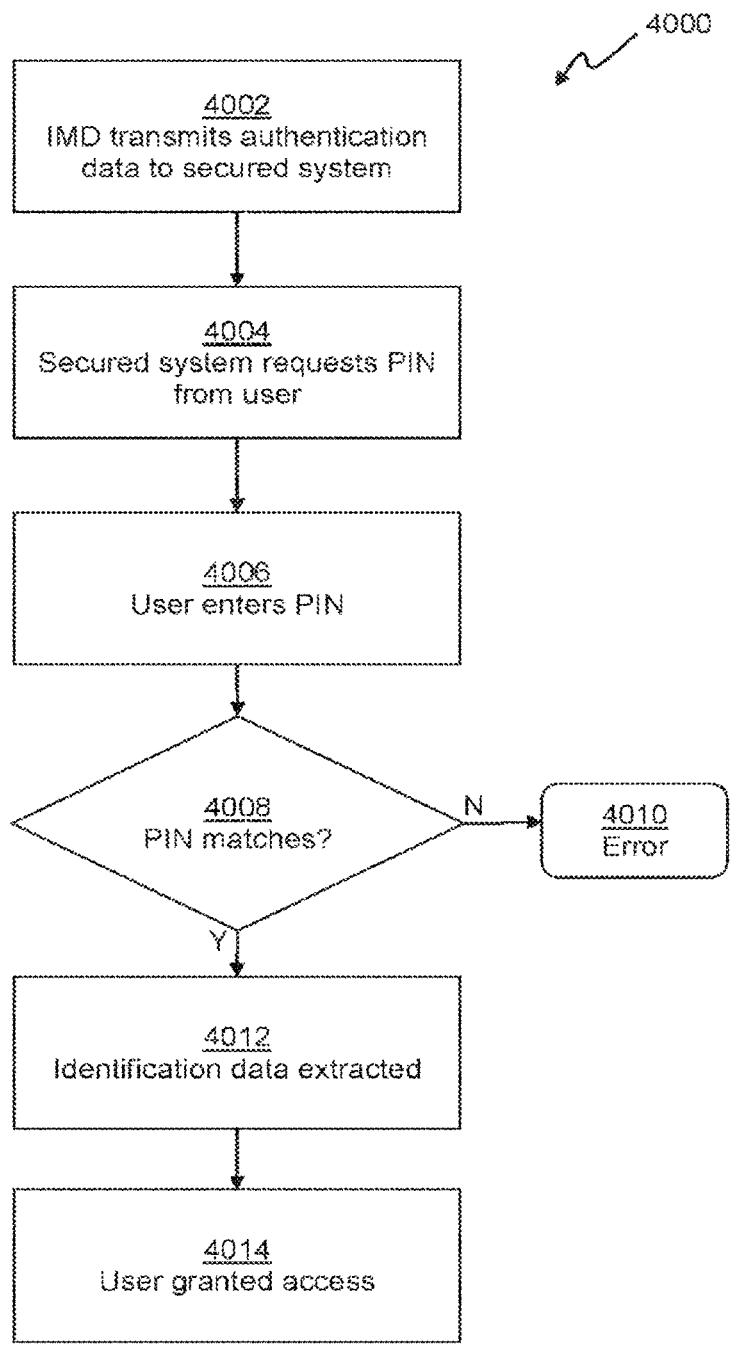
FIG. 15 is a flowchart depicting a method access control, according to an embodiment.
Figure 16:
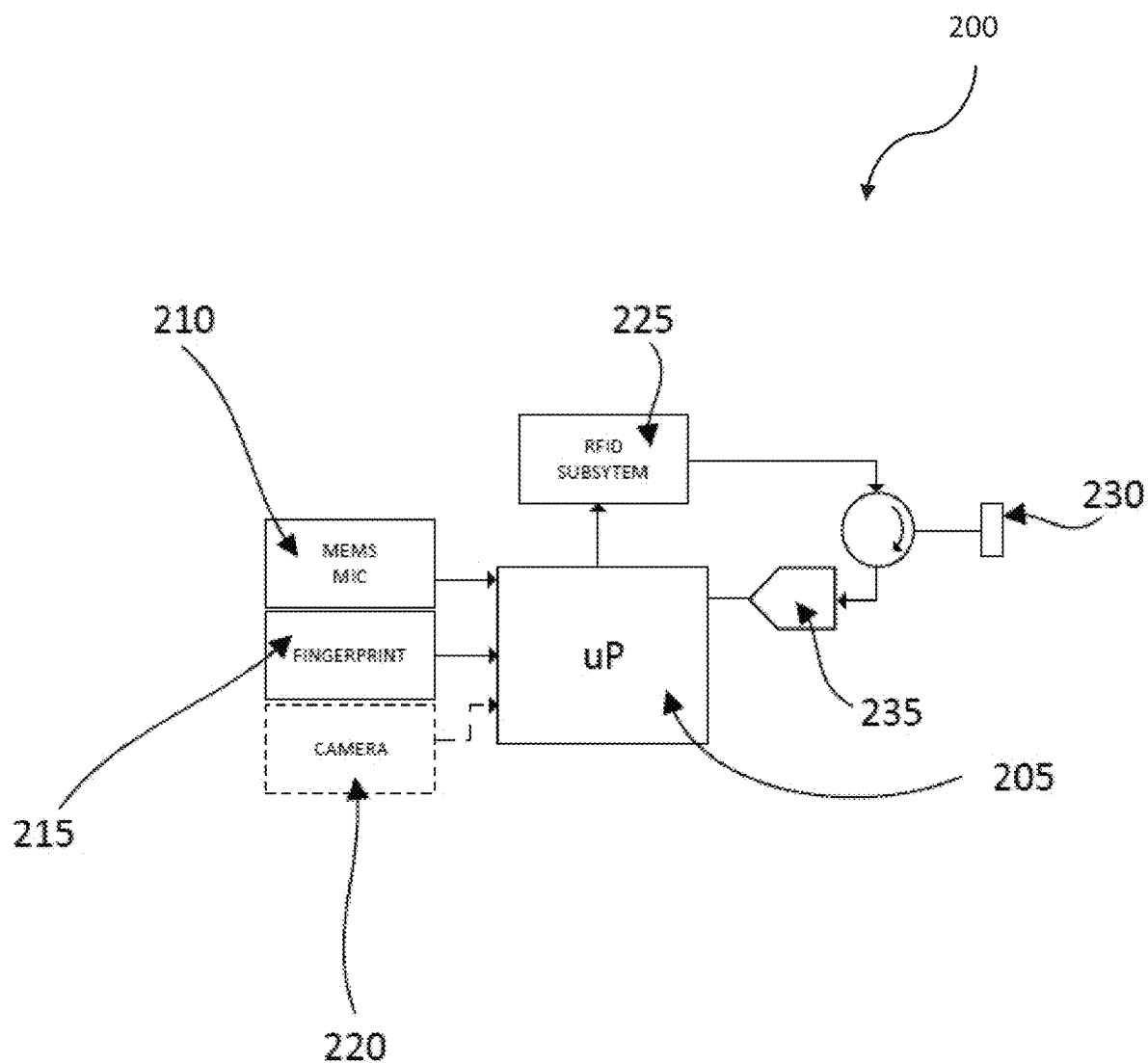
FIG. 16 is a schematic view of a radio frequency identification (RFID) unique identity circuit architecture.
Figure 17:
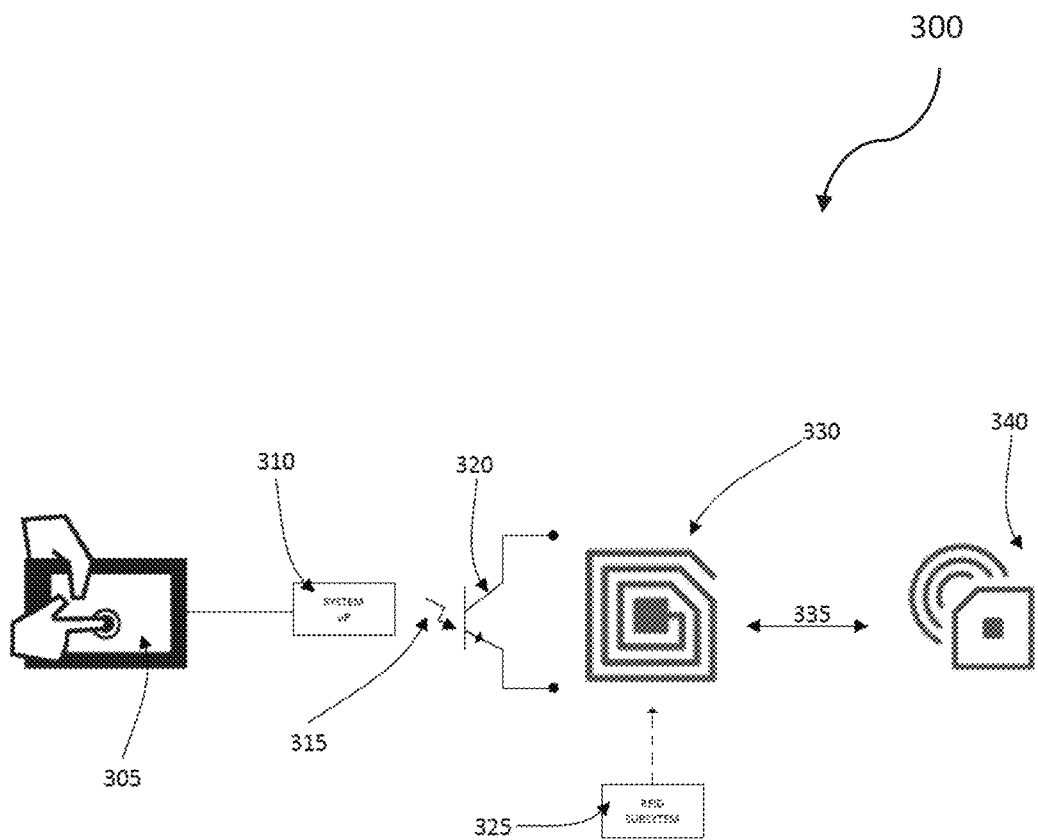
FIG. 17 is a schematic view of an opto-isolated switch schema for restricting code transmissions.

FIG. 15 is a flowchart depicting a method 4000 for granting a user access to a resource, according to an embodiment. At 4002, an identity management device 100 can transmit authentication data 206, or other portions of a selected identity record 200 to a secured system. For example, authentication data 206 can comprise one or more X.509 public key infrastructure (PKI) certificates comprising electronic data interchange personal identifier (EDIPI) data encrypted based on a personal identification number (PIN). In embodiments, the authentication data 206 can be transmitted to the secured system by the identity management device 100 by wireless transmission via communications interface 110, an RF signal generated by RF output 116 or by displaying a computer-readable image (such as a bar code) for optical scanning.

At 4004 the secured system can request the PIN or other encryption key from the user. At 4006 the secured system can receive the requested PIN from the user. At 4008, the PIN can be checked for a match with one of the PKI certificates stored in the authentication data 206. If the PIN does not match, an error can be generated at 4010. If the PIN does match, identifying information, such as an EDIPI can be extracted at 4012. In embodiments, PIN matching can be facilitated by API 500. For example, API 500 can provide a service to provide a "match" or "no match" Boolean result given an input PIN and PKI certificate. In other embodiments, API 500 can provide identification or authorization services based on a received PIN, received PKI certificate, or both. For example, API 500 could provide an EDIPI in response to receiving a valid PIN and certificate, or could provide a determination regarding whether the identified (authenticated) user is authorized to access a secured resource, based on centralized authorization configuration data stored by API 500. At 4014, the user can be granted access to the secured system based on a successful authentication based on the authentication data 206 stored in memory 104 (what the user has), and the user's PIN (what the user knows).

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Typical passive RFID tags are in abundance from use in secured entry points (e.g., data centers, medical centers) and other supply chain scenarios such as asset tracking. In the arena of secured entry, and secured assets there is a need to prevent or restrict access to the entry points beyond the capability of the legacy RFID tag. Such cases include a lost gate card that hasn't been reported missing or stolen yet, or limited timed access to medicine cabinet in a medical facility or hospital. Due to large number of legacy systems already in place across the globe, it is desired to modify an existing RFID tag to be coupled with user identity information. The identity can include biometric indicators like a fingerprint, or camera, or voice recognition using a MEMs microphone. The present disclosure may use an optically isolated switch to limit communication between the RFID and the reader based on the unique identity or token. When the circuit is not engaged, the RFID tag will operate as originally intended with latch mechanism only engaging in targeted scenarios. This truly lends itself as a digital transformation solution for brownfield RF tags and readers.

The unique identity subsystem 200 includes microprocessor 205 with several system on chip options to include biometric fingerprint authentication 215, press and hold voice recognition 210, and camera facial recognition 220. Some embodiments could include EKG signatures and other state-of-the-art technologies that become available. With each identifier, the onboard algorithm shall be capable of muting the RFID subsystem 225 in line with received RF signal 230 emanating from the antenna. Using various solid-state components 235, the noise floors between the host microprocessor and RFID subsystem are galvanically isolated.

Outlining the use of operation, the user will press the finger on the fingerprint sensors 305. The onboard microprocessor scans for recognition of the approved fingerprint. If the fingerprint does not match, the microprocessor will optically 315 latch a solid-state switch 320 that shorts the receive antenna 330 as referenced by the RFID integrated circuit 325. This will inhibit data 335 transmission between the reader 340 and RF tag, preventing the unauthorized user from gaining entrance.

Embodiments of the present disclosure provide a number of advantages over existing methods and techniques for storing and distributing identifying material. Embodiments enable the storage and management of a library of contact information both for multiple personas or identities of the user, and also for tracking and management of contacts that the user makes. Embodiments limit the need to carry multiples of different business cards, or carrying multiple security credentials. Embodiments improve the quality of interactions between individuals or other entities or agents, by reducing the inconveniences that arise as a result of carrying tangible forms of identifying material, such as business cards. Embodiments further improve identity sharing and verification systems, by providing a secure device for storage of identification and authentication data.

The identity management device of the present disclosure provides secure storage, transmission, and display of identity information. The ability to pair and communicate with a user device can enable the user to transmit identifying material as images to the device, and to edit or delete pre-existing information. The user device can also be a channel through which the identity management device may broadcast information to other devices or applications via the user device's broadcasting capabilities. This enables the identity management functionality of the device to be extended to alternative or high-powered transmission methods and protocols without the need for hardware and software support for these transmission mechanisms in the identification management device itself.

Embodiments of the present disclosure can provide a portable device for storing identification and authentication data. The small size of the device can enable identity management devices to be carried in a pocket, wallet, or keychain. The device can also require less power than other portable electronic devices (such as mobile phones), because the device can have a low-power electronic paper display, which will only use power when being updated. Because embodiments include the ability to broadcast information through a separate user device, embodiments of the present disclosure can avoid the implementation or use of higher energy wireless communication schemes such as WiFi.

Embodiments of the present disclosure provide security measures to limit viewing or accessing stored or transmitted data to only authorized or permitted agents. Embodiments provide the security of stored information, such that access is restricted to certain trusted agents or entities, thereby, keeping private information outside of the hands of bad actors, and security of information during broadcast or exchange, such that host-selected information is only visible to host-selected agents.

Embodiments of the present disclosure improve can the interaction experience during information exchange, as well as providing interactions with databases such as those of digital rights access and private account access.

Embodiments can mitigate the threats of identity theft, fraud, or other criminal activities and negative externalities that may arise as the result of the combination of identifying material and bad actors. For example, bad actors may take on an outdated identity that can be the manifestation of an outdated association with an organization, such as a terminated employee using use credentials created before the termination to gain access to resources. While conventional systems can provide for this, if the authorization information for each resource is properly updated upon termination, the cost of updating and securing identifying information may be very high, in terms of risk, time, resources, and forgone opportunities, for the individuals responsible for the update. More specifically, these costs can present themselves as inefficiencies that arise as a result of lack of coordination between the transmitters and the receivers. The act of updating business cards and digital rights badges is expensive for a company, as well as for the individuals who work such a company because conventional technologies do not provide centralized or electronic means for managing such updates. These issues can arise from a latency period for the update.

Embodiments also provide improved technology for transmitting identifying information that must remain secure, such as payment information, private identification information (PII) and credentials, such as insurance cards, driver's licenses, passports, or other government issued identification credentials. Such credentials require robust security measures and there is significant risk involved for the host both for data transfer, and data-at-rest as stored on devices. Embodiments therefore provide for encryption of data-at-rest and data-in-transit, with authentication requirements that can vary for each type of identification record.

In embodiments, system 10 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random-access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out.

In addition, an engine can itself be composed of more than one sub-engine, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 18:
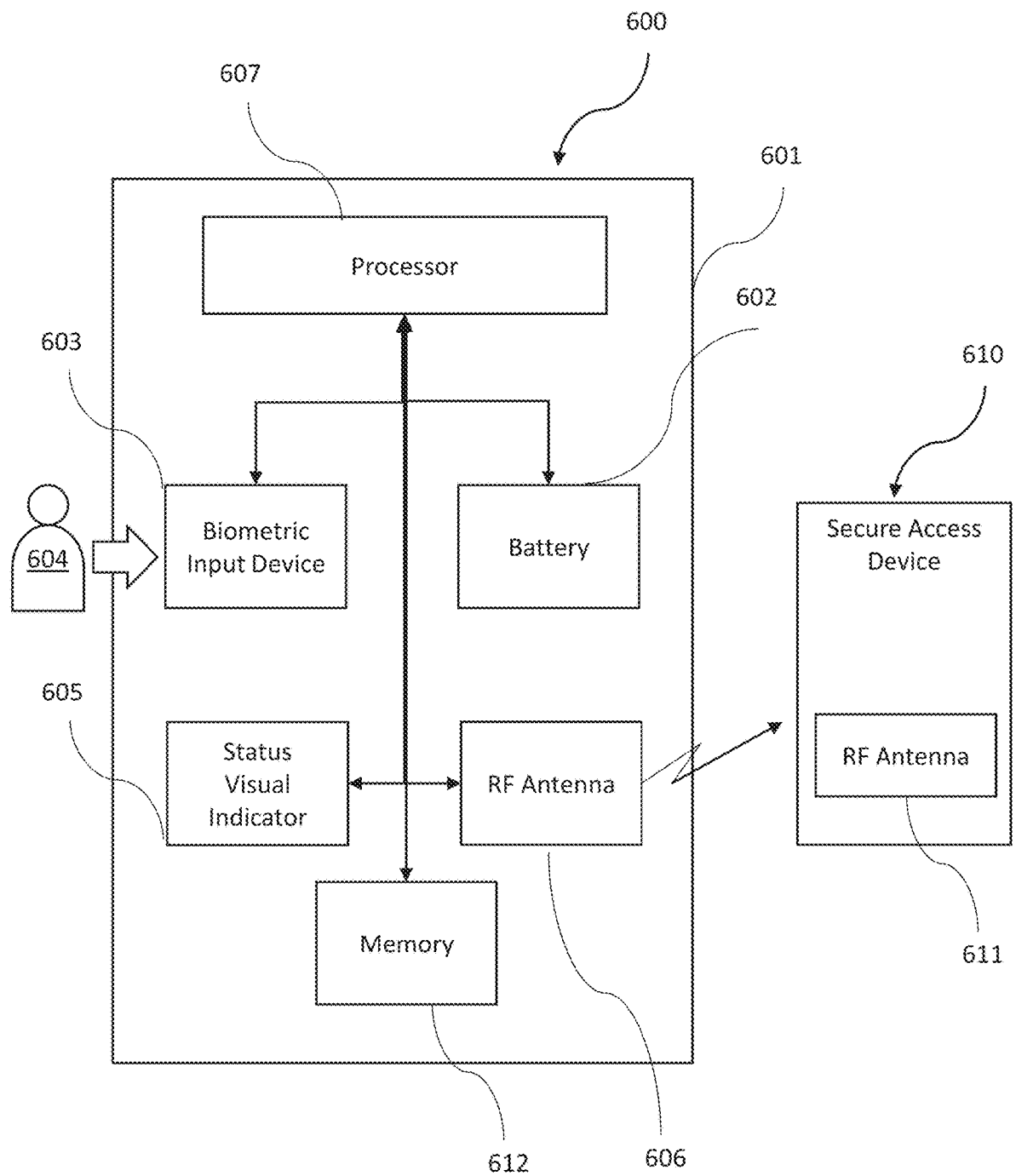
FIG. 18 is a schematic diagram of a first embodiment of a secure access token device, according to the present disclosure.

Referring now to FIG. 18, a secure access token device 600 according to the present disclosure is now described. The secure access token device 600 illustratively comprises a portable housing 601. The portable housing 601 may comprise a dielectric material (e.g., plastic polymer material) so as to not cause RF interference. As will be appreciated, the portable housing 601 has a form factor of a typical secure access token card, such as shown in FIGS. 19-25 (i.e., handheld physical security token). The secure access token device 600 comprises a battery 602 carried by the portable housing 601 and configured to provide on-board power, and a biometric input device 603 carried by the portable housing and configured to generate a biometric data of a user 604. In one embodiment, the biometric input device 603 may comprise a fingerprint scanner, and the biometric data comprises fingerprint biometric data of the user 604. The biometric input device 603 may also comprise an infrared scanner in other embodiments, for example, the infrared scanner may be configured to scan a face of the user 604.

The secure access token device 600 also includes a status visual indicator 605 carried by the portable housing 601. The status visual indicator 605 may comprise a light emitting diode (LED) indicator, for example. The secure access token device 600 includes an RF antenna 606 carried by the portable housing 601. In some embodiments, the RF antenna 606 may comprise a coil form antenna operable for short range communications in one or more of, for example, a near field communications (NFC) range, a low frequency RFID frequency range 30 kHz-300 kHz (e.g., 125 kHz), a high frequency RFID frequency range 3-30 MHz, and a Bluetooth Low Energy (BLE) range.

The secure access token device 600 also includes a processor 607 carried by the portable housing 601 and coupled to the battery 602, the biometric input device 603, the status visual indicator 605, and the RF antenna 606. The processor 607 is configured to transit via the RF antenna 606 an RF signal to a secure access device 610 controlling access to a secured resource. The secure access device 610 also includes a companion RF antenna 611 configured to receive the RF signal from the secure access token device 600. As will be appreciated, the secured resource may comprise physical access to a location (i.e., unlocking a door) or elevated access to a database, for example. In other words, the secure access token device 600 may be part of a physical security system for a building, or integrated within a computing device, for example.

The RF signal transmitted to the secure access device 610 is based upon a unique identifier (i.e., the token) associated with the user 604, and the RF signal is transmitted only when the biometric data matches one of a plurality of authentic biometric data templates. The secure access token device 600 further comprises a memory 612 carried by the portable housing 601 and coupled to the processor 607. The processor 607 is configured to store the plurality of authentic biometric data templates in the memory 612. In other words, the plurality of authentic biometric data templates is generated based upon enrolled users with designated access to the secured resource. As will be appreciated, the token may comprise a 26-bit unique identifier, such as used in HID proximity card access systems.

Of course, the secure access token device 600 may be associated with a single user 604, and there would be only a single stored authentic biometric data template or multiple stored authentic biometric data templates associated with the single user (i.e., multiple fingers being enrolled) in the memory 612. In this embodiment, the portable housing 601 may include identification indicia on an external surface. For example, the identification indicia may comprise one or more of a photo identification, a name of the user 604, and a QR code linked to the contact information for the user. In this embodiment, the user 604 may be verified by the identification indicia and/or the biometric scan of the biometric input device 603.

In some embodiments, the processor 607 is configured to store a plurality of unique tokens in the memory 612 for accessing respective different secured resources. When the biometric data matches one of a plurality of authentic biometric data templates, the processor 607 is configured to generate an RF signal transmitted to the secure access device 610. The RF signal may be based upon one or more of the plurality of unique tokens in the memory 612. In some embodiments, the RF signal may transmit each of the plurality of unique tokens sequentially (e.g., with time spacing of sufficient for detection by the secure access device 610), thereby providing access regardless of the token needed. In other embodiments, the user 604 may select the token to transmit based upon an additional input on the biometric input device 603. For example, the user may tap the biometric input device 603 a select number of times to select the token to transmit. In yet another embodiment, the secure access token device 600 may comprise a toggle switch coupled to the processor 607, and the toggle switch, via its input position, is configured to select the token to be transmitted. For example, the user 604 may select a second given token by toggling the switch two times.

The processor 607 may be configured to activate the status visual indicator 605 when the biometric data matches one of the plurality of authentic biometric data templates stored in the memory 612. For example, the status visual indicator 605 may generate an approved indication (e.g., green light) when the match occurs. In the alternative, the processor 607 may be configured to activate the status visual indicator 605 when the biometric data does not match one of the plurality of authentic biometric data templates stored in the memory 612. For example, the status visual indicator 605 may generate a disapproved indication (e.g., red light) when the match does not occur.

In some embodiments, the secure access token device 600 may include a charging interface (not shown) for recharging the battery 602. The charging interface may comprise a charging port, such as a USB charging port (e.g., Type C USB or micro-USB). In other embodiments, the charging interface may comprise a wireless charging interface having a charging RF antenna coupled to the battery 602.

Another aspect is directed to a method of making a secure access token device 600. The method comprises coupling a battery 602 carried by a portable housing 601, coupling a biometric input device 603 carried by the portable housing and configured to generate a biometric data of a user 604, and coupling a status visual indicator 605 carried by the portable housing. The method further includes coupling an RF antenna 606 carried by the portable housing 601, and coupling a processor 607 carried by the portable housing and to the battery 602, the biometric input device 603, the status visual indicator 605, and the RF antenna. The processor 607 is configured to transit via the RF antenna 606 an RF signal based upon a unique identifier when the biometric data matches an authentic biometric data template.

Figure 19:
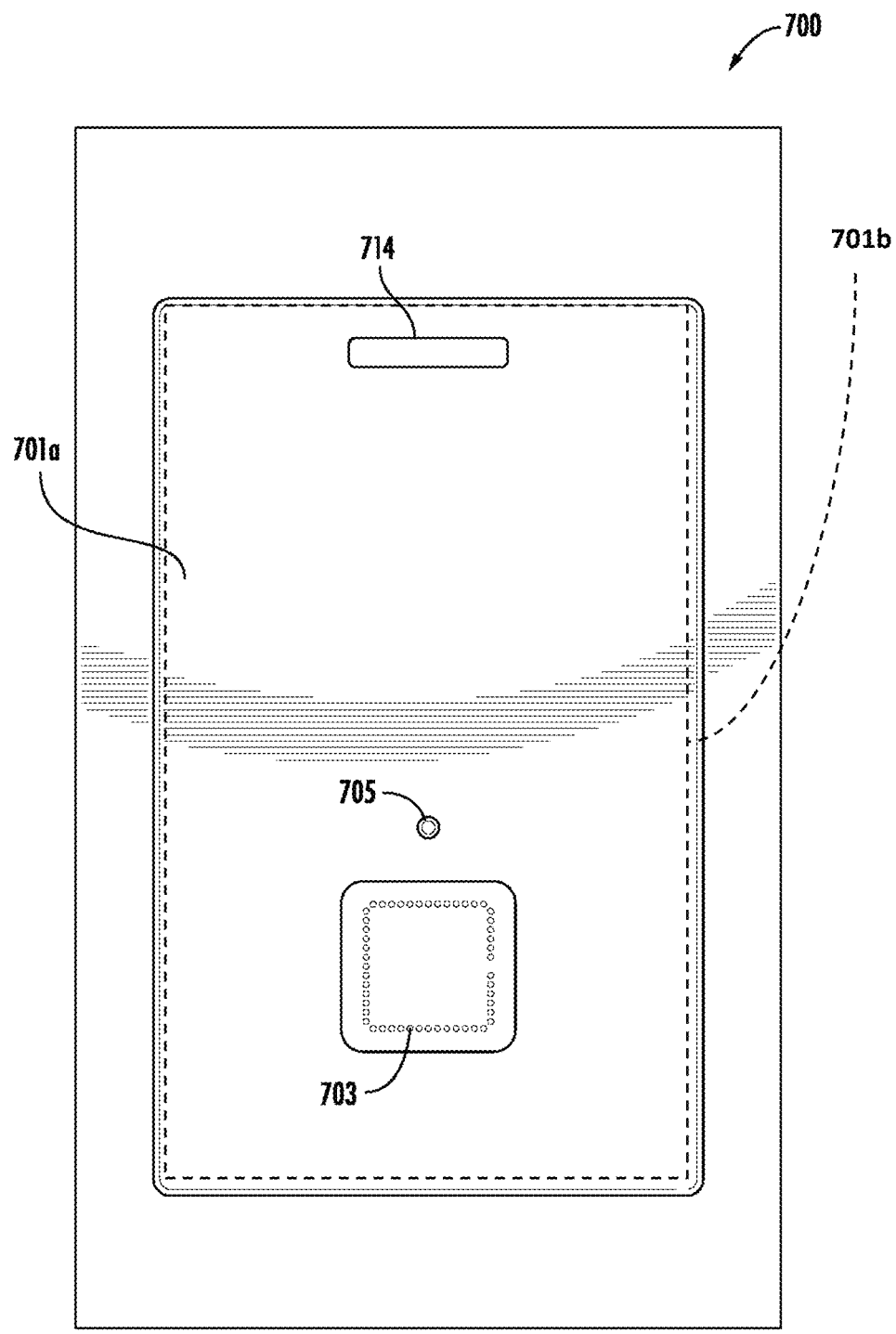
FIG. 19 is a top plan view of a second embodiment of the secure access token device.
Figure 20A:
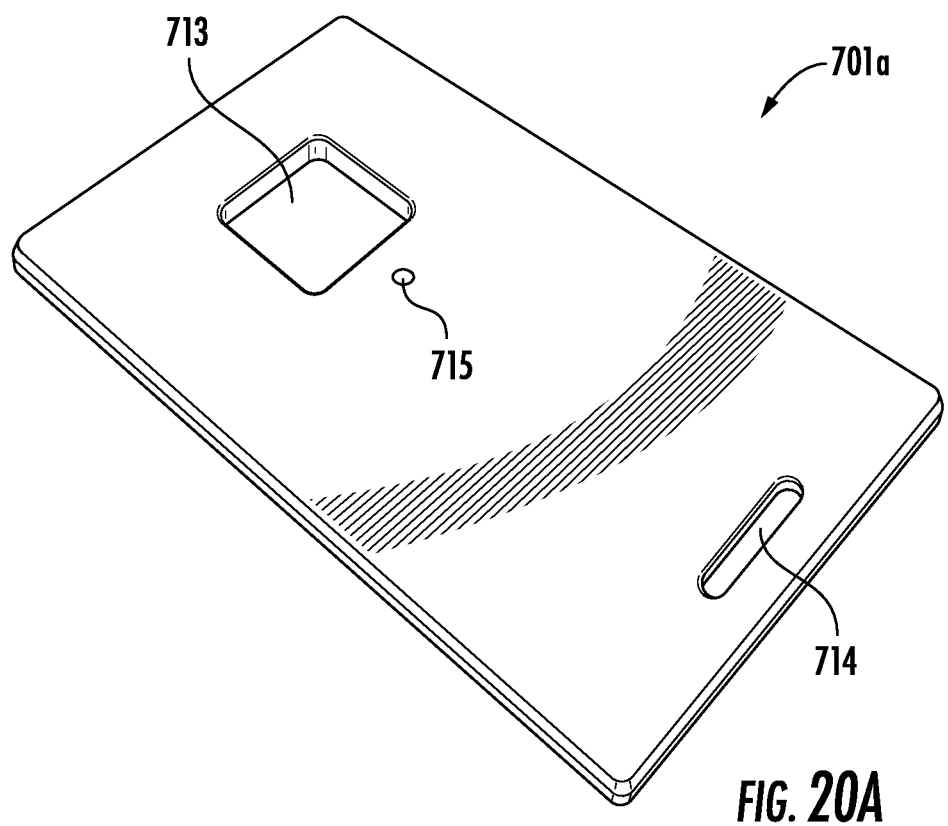
FIGS. 20A-20B are perspective views of the portable housing of the second embodiment of the secure access token device.
Figure 20B:
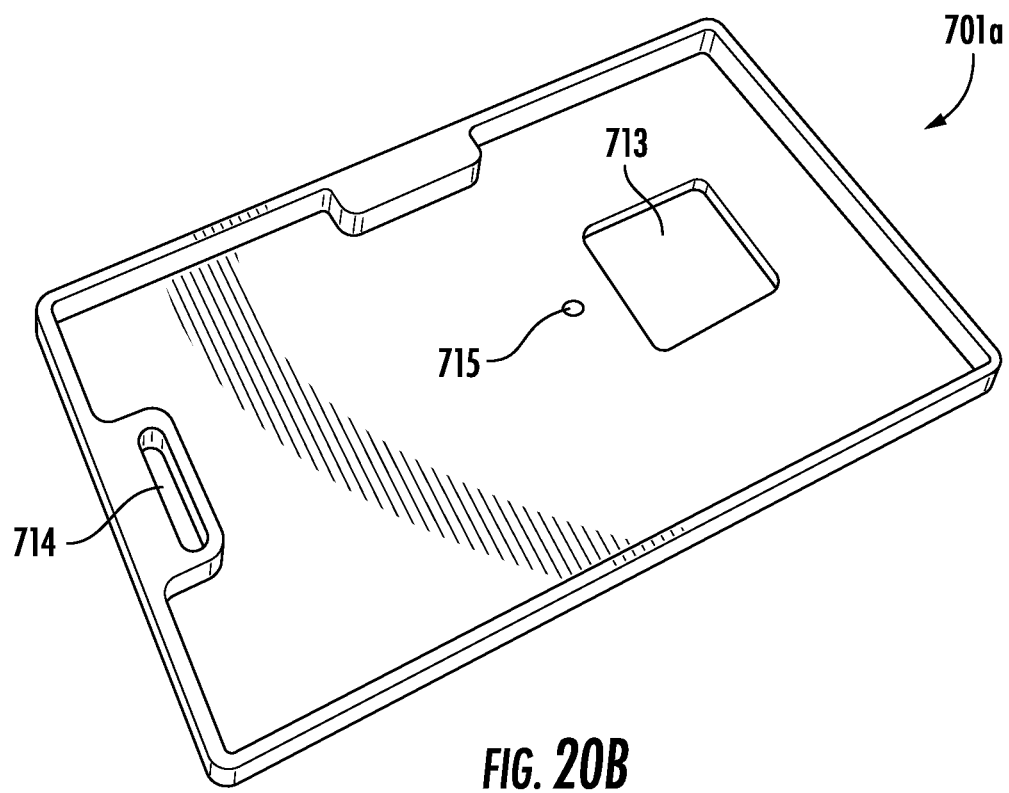
Figure 21:
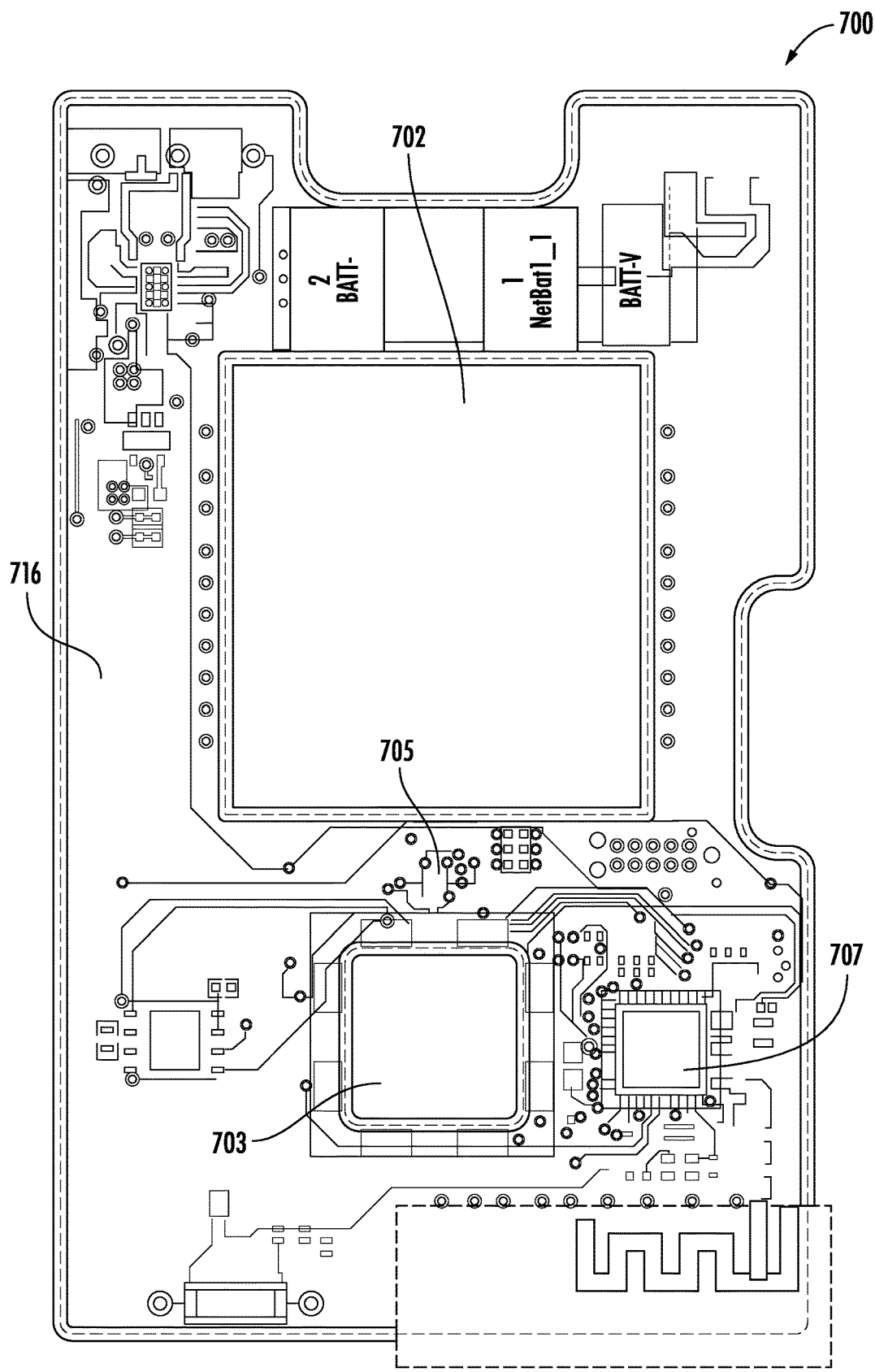
FIG. 21 is a circuit diagram of the second embodiment of the secure access token device.
Figure 22:
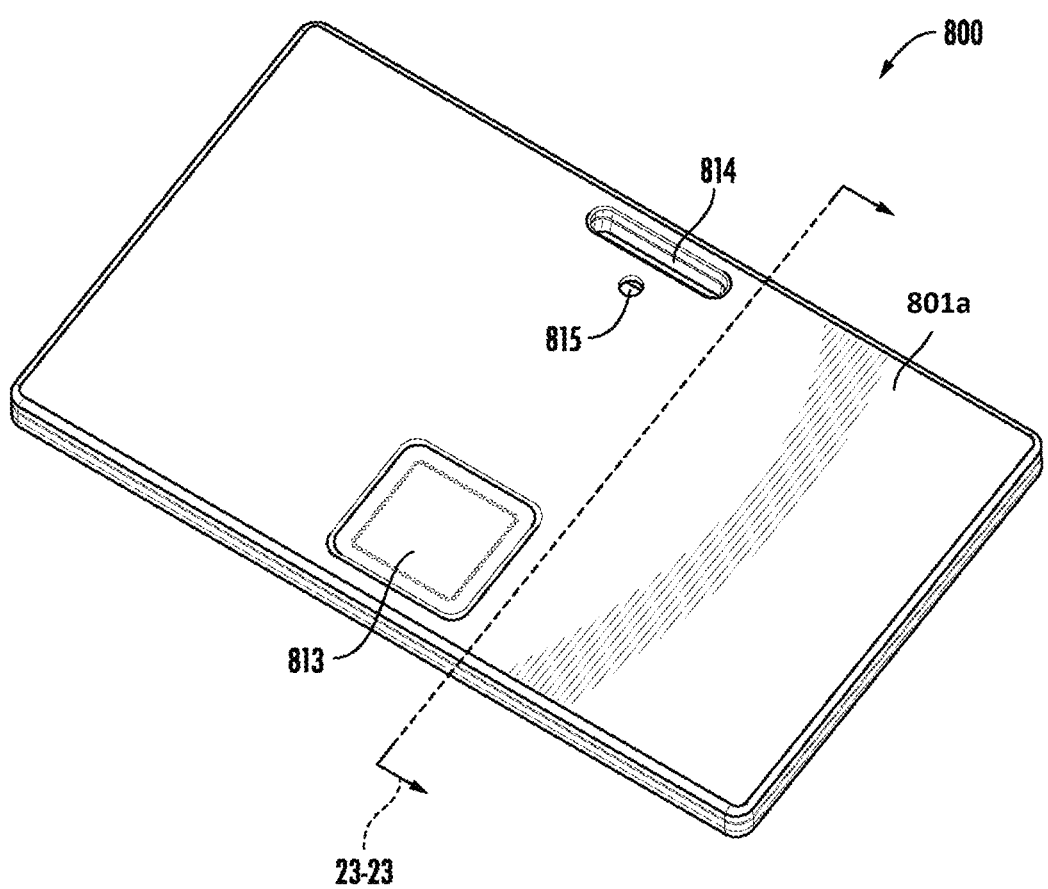
FIG. 22 is a perspective view of a third embodiment of the secure access token device.
Figure 23:
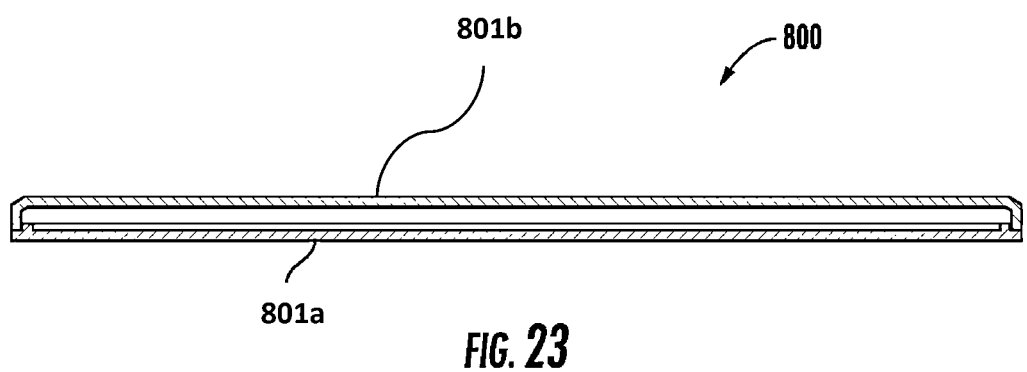
FIG. 23 is a cross-sectional view of the third embodiment of the secure access token device along line 23-23.
Figure 24:
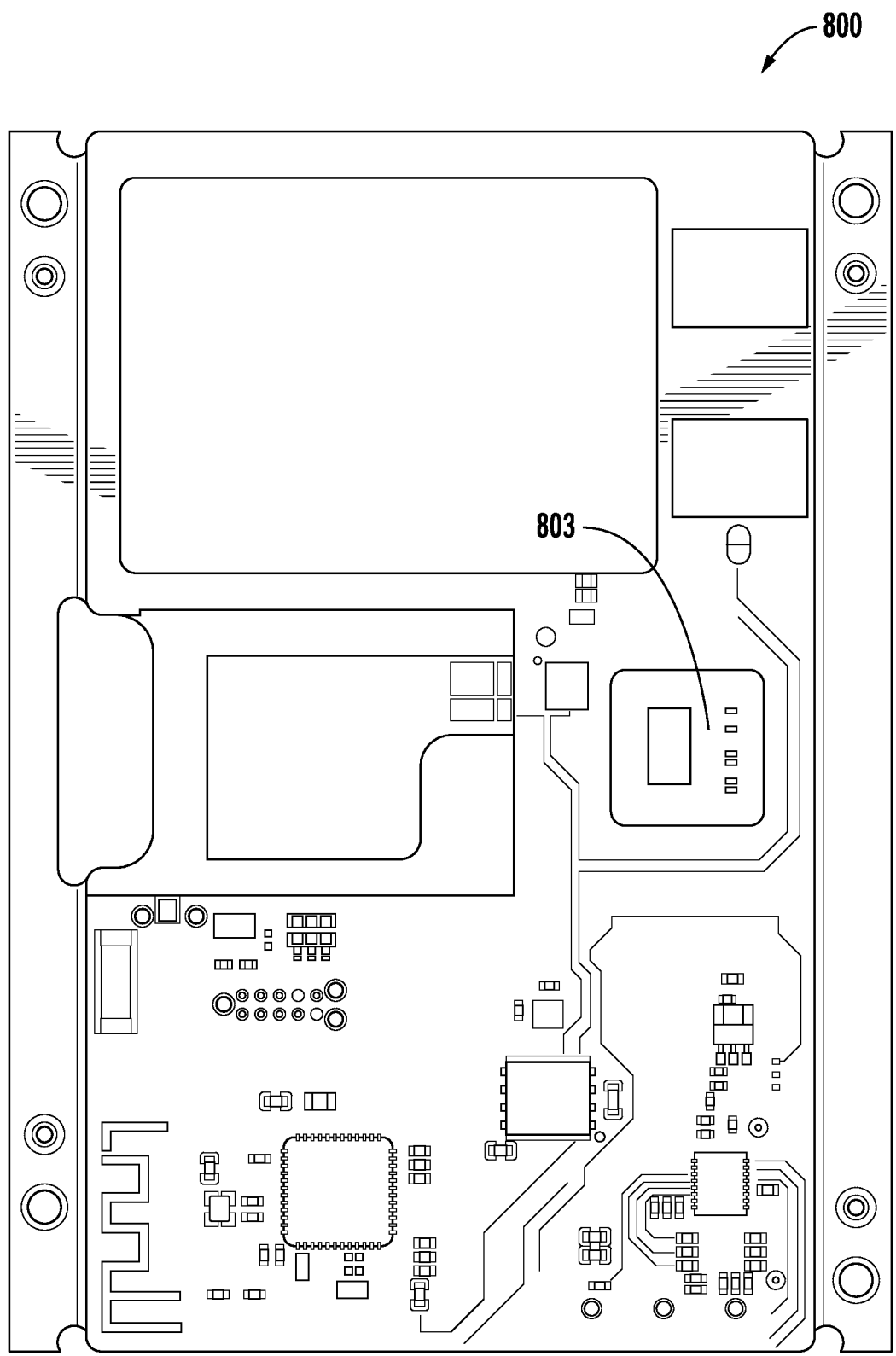
FIG. 24 is a top plan view of the third embodiment of the secure access token device without the portable housing.
Figure 25:
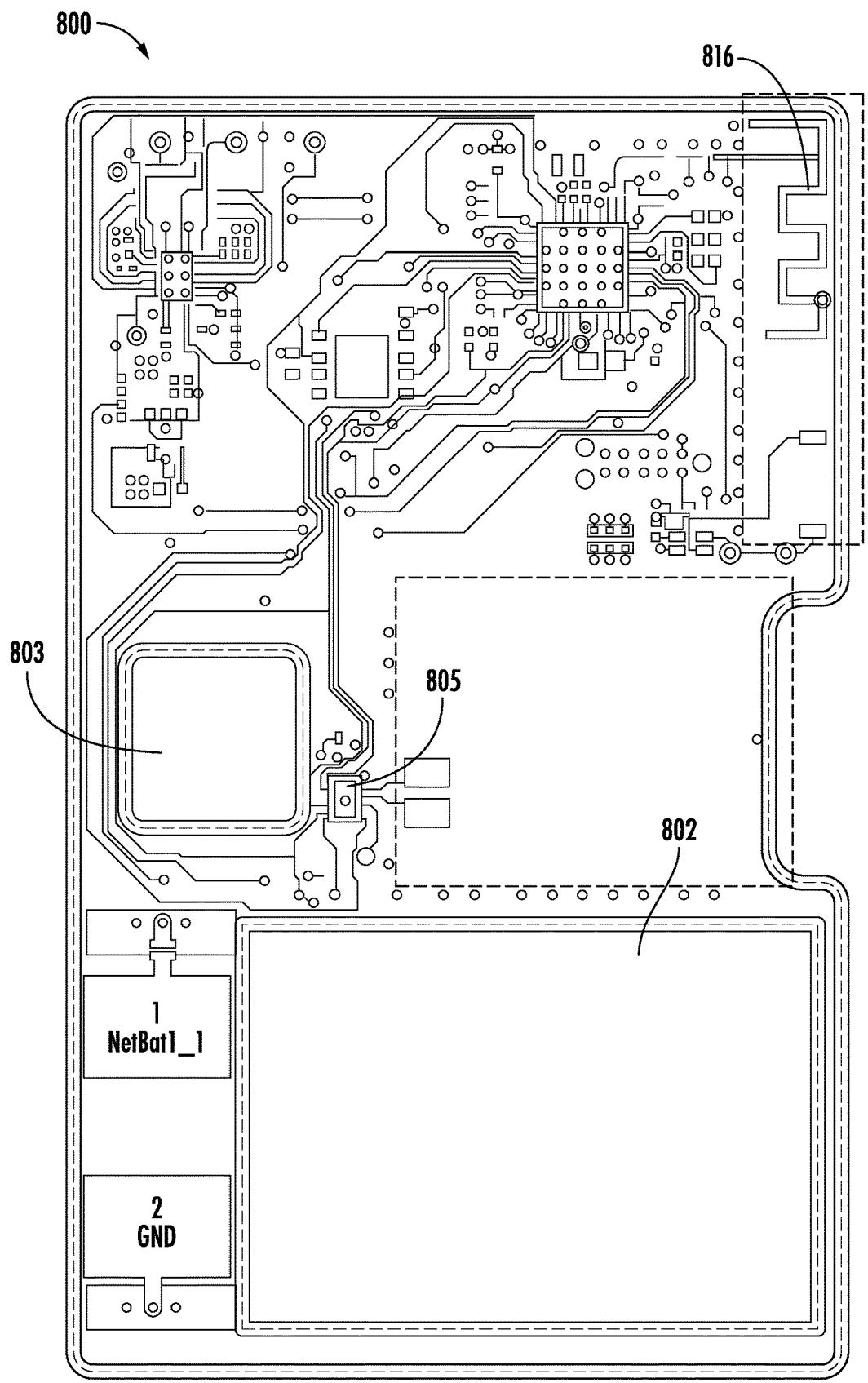
FIG. 25 is a circuit diagram of the third embodiment of the secure access token device.

Referring now additionally to FIGS. 19-21, another embodiment of the secure access token device 700 is now described. In this embodiment of the secure access token device 700, those elements already discussed above with respect to FIG. 18 are incremented by 100 and most require no further discussion herein. This embodiment differs from the previous embodiment in that this secure access token device 700 illustratively includes a portable housing 701a-701b with a portrait form factor and having first second partitions 701a-701b. Also, the first portion 701a of the portable housing illustratively includes a first opening 713 for providing access to the biometric input device 703, a second opening 714 for receiving an attachment accessory (e.g., key chain loop, or retractable belt tie), and a third opening 715 for receiving the output of the status visual indicator 705. As perhaps best seen in FIG. 21, the secure access token device 700 comprises a circuit board 716 carrying the battery 702, the biometric input device 703, the status visual indicator 705, the RF antenna 706, and the memory 712.

Referring now additionally to FIGS. 22-25, another embodiment of the secure access token device 800 is now described. In this embodiment of the secure access token device 800, those elements already discussed above with respect to FIGS. 18 & 19-21 are incremented by 200 and most require no further discussion herein. This embodiment differs from the previous embodiment in that this secure access token device 800 illustratively includes a portable housing 801a-801b with a landscape form factor. As perhaps best seen in FIG. 23, this portable housing 801a-801b also comprises first and second partitions that are fitted together using one or more of friction/interface locking, and an adhesive material.

Advantageously, the secure access token devices 600, 700, 800 may provide an approach to a problem with existing secure access tokens. The physical security of the secure access token is generally assumed. So, if an unauthorized user possessed the secure access token, the unauthorized user may access the secured resource. Because of this, the lack of physical security of a single secure access token can compromise security. The secure access token devices 600, 700, 800 may provide an approach to this problem by tying the functionality of the secure access token devices to biometric data of the user. If the user 604 is not authenticated via the biometric data, the secure access token devices 600, 700, 800 do not function and security is not compromised.

Figure 26:
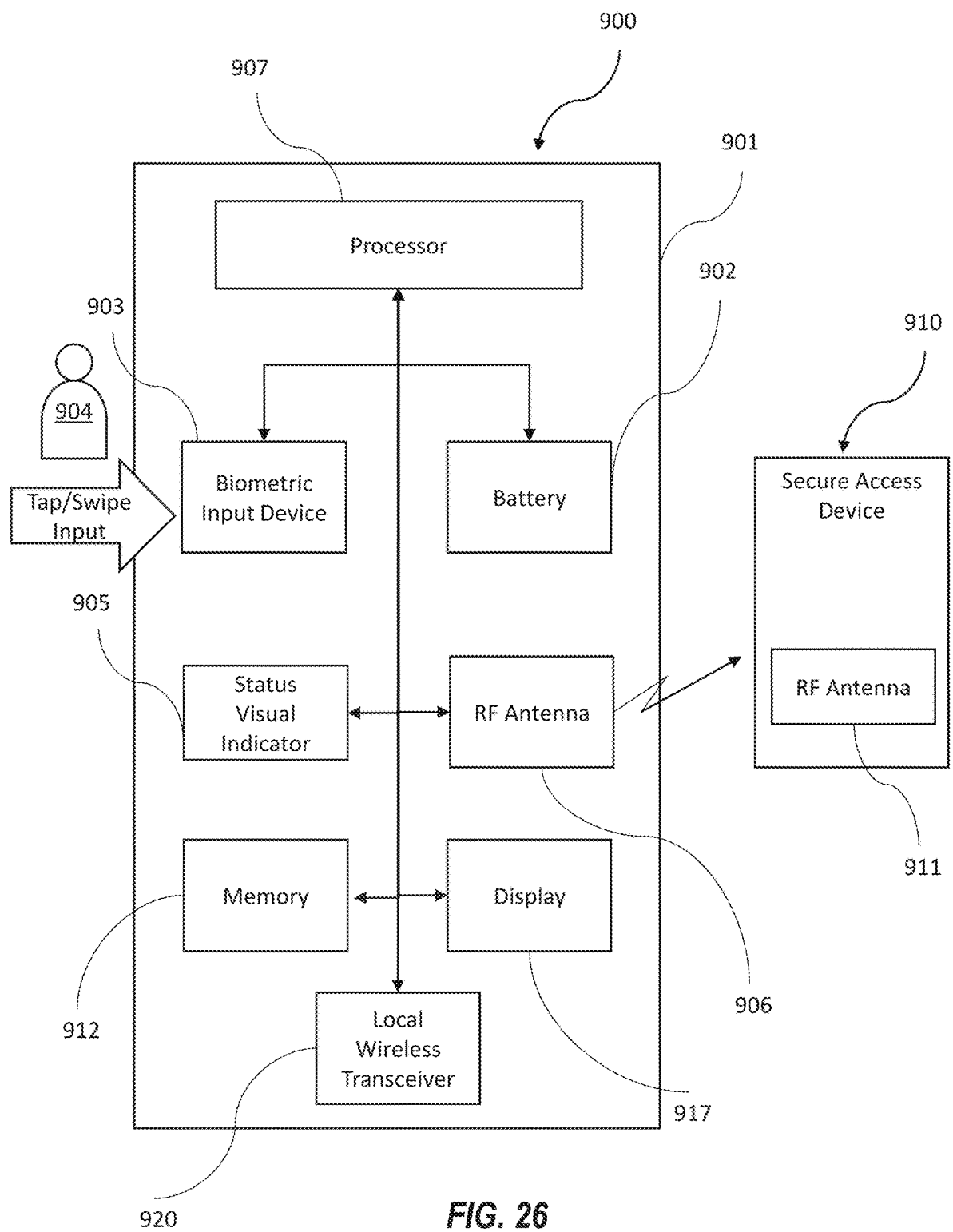
FIG. 26 is a schematic diagram of a fourth embodiment of the secure access token device, according to the present disclosure.

Referring now additionally to FIG. 26, another embodiment of the secure access token device 900 is now described. In this embodiment of the secure access token device 900, those elements already discussed above with respect to FIGS. 18 & 19-21 are incremented by 300 and most require no further discussion herein. This embodiment differs from the previous embodiment in that this secure access token device 900 illustratively includes the processor 907 configured to store a plurality of unique tokens in the memory 912 for accessing respective different secured resources, determine a selected unique token from the plurality of unique tokens based upon an additional input on the biometric input device 903, and transit via the RF antenna 906 an RF signal based upon the selected unique token when the biometric data matches an authentic biometric data template.

The additional input illustratively includes one or more of a tap input on the biometric input device 903, and a swipe input on the biometric input device. In other words, the user 904 may activate and select the unique token for gaining access to the secured resource. For example, the user 904 may select a third unique token from the plurality of unique tokens by tapping/swiping the biometric input device 903 three times.

In the illustrated embodiment, the secure access token device 900 includes a display 917 carried by the portable housing 901 and coupled to the processor 907. The processor 907 is configured to generate a user interface on the display 917 for rendering the selected unique token from the plurality of unique tokens within the UI. The UI may be similar to the UI depicted in FIGS. 8A-8G. The display 917 may provide visual feedback while the user 904 provides the tap/swipe input on the biometric input device 903, assuring the right token is selected.

Similar to the identity management device 100 of FIGS. 1-15, the processor 907 may be configured to store a plurality of identification records in the memory 912, each identification record comprising visual identification data, and generate another user interface on the display 917 to render the visual identification data of a selected identification record of the plurality of identification records. The user interface switches between the visual identification data of the selected identification record rendered in a first user-readable format and a second machine-readable format based upon the biometric input device.

In some embodiments, the secure access token device 900 may conserve power within the battery 902 by selectively powering the RF antenna 906. The processor 907 may power the RF antenna 906 only when the additional input on the biometric input device 903 is detected (i.e., the secure access token device 900 works as a physical token only when activated). In other embodiments, the secure access token device 900 may comprise a passive antenna for receiving signals from the secure access device 910 to one or both of charging the battery 902 and operating the processor 907.

In some applications, the secure access token device 900 may be used for FIDO authentication of a personal computer/website/secure resource of the user 904. For example, the user 904 may use the secure access token device 900 periodically to authenticate with the personal computer/website/secure resource.

In some embodiments, the portable housing 901 may have identification information on the external surface. For example, the picture identification of the user 904 may be printed on the external surface of the portable housing 901.

Another aspect is directed to a method for making a secure access token device 900. The method comprises coupling a battery 902 to be carried by a portable housing 901, coupling a biometric input device 903 to be carried by the portable housing and configured to generate biometric data of a user 904, and coupling a status visual indicator 905 to be carried by the portable housing. The method also includes coupling an RF antenna 906 to be carried by the portable housing 901, coupling a memory 912 to be carried by the portable housing, and coupling a processor 907 to be carried by the portable housing and to the battery 902, the biometric input device 903, the status visual indicator 905, the RF antenna, and the memory 912. The processor 907 is configured to store a plurality of unique tokens in the memory 912 for accessing respective different secured resources, determine a selected unique token from the plurality of unique tokens based upon an additional input on the biometric input device 903, and transit via the RF antenna 906 an RF signal based upon the selected unique token when the biometric data matches an authentic biometric data template.

In some applications, the secure access token devices 600, 700, 800, 900 may be used in combination with the disclosed identity management device 100. For example, the secure access token device 900 illustratively includes a local wireless transceiver 920 configured to communicate with the identity management device 100. The local wireless transceiver 920 may comprise a Bluetooth transceiver (standard power or BLE), or a Zigbee transceiver, for example. Helpfully, the biometric authentication function may be performed by either the identity management device 100 or the secure access token device 900. For instance, the secure access token device 900 may authenticate the user 904 and provide access to the identity application on the identity management device 100. In some embodiments, the identity management device 100 may authenticate the user 904 and provide access to the secured resource without the secure access token device 900.

It should be appreciated that the secure access token devices 600, 700, 800, 900 may be used in combination with the disclosed identity management device 100. Also, features from the identity management device 100 may be combined with the secure access token devices 600, 700, 800, 900 and vice versa.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A secure access token device comprising:
    a portable housing;
    a battery carried by the portable housing;
    a biometric input device carried by the portable housing and configured to generate biometric data of a user;
    a status visual indicator carried by the portable housing;
    a radio frequency (RF) antenna carried by the portable housing;
    a memory carried by the portable housing; and
    a processor carried by the portable housing and coupled to the battery, the biometric input device, the status visual indicator, the RF antenna, and the memory;
    the processor configured to
        store a plurality of unique tokens in the memory for accessing respective different secured resources,
        determine a selected unique token from the plurality of unique tokens based upon an additional input on the biometric input device, and
        transit via the RF antenna an RF signal based upon the selected unique token when the biometric data matches an authentic biometric data template.

2. The secure access token device of claim 1 wherein the additional input comprises a tap input on the biometric input device.

3. The secure access token device of claim 1 wherein the additional input comprises a swipe input on the biometric input device.

4. The secure access token device of claim 1 wherein the processor is configured to store the authentic biometric data template in the memory.

5. The secure access token device of claim 1 wherein the processor is configured to activate the status visual indicator when the biometric data matches the authentic biometric data template.

6. The secure access token device of claim 1 wherein the biometric input device comprises a fingerprint scanner.

7. The secure access token device of claim 1 further comprising a display carried by the portable housing and coupled to the processor.

8. The secure access token device of claim 7 wherein the processor is configured to generate a user interface on the display for rendering the selected unique token from the plurality of unique tokens.

9. The secure access token device of claim 7 wherein the processor is configured to:
    store a plurality of identification records in the memory, each identification record comprising visual identification data; and
    generate a user interface on the display to render the visual identification data of a selected identification record of the plurality of identification records, the user interface switching between the visual identification data of the selected identification record rendered in a first user-readable format and a second machine-readable format based upon the biometric input device.

10. A secure access token device comprising:
    a portable housing;
    a battery carried by the portable housing;
    a fingerprint scanner device carried by the portable housing and configured to generate biometric data of a user;
    a status visual indicator carried by the portable housing;
    a radio frequency (RF) antenna carried by the portable housing;
    a memory carried by the portable housing;
    a display carried by the portable housing; and
    a processor carried by the portable housing and coupled to the battery, the fingerprint scanner device, the status visual indicator, the RF antenna, the memory, and the display;

the processor configured to
  store a plurality of unique tokens in the memory for accessing respective different secured resources,
  determine a selected unique token from the plurality of unique tokens based upon an additional input on the fingerprint scanner device,
  generate a user interface on the display for rendering the selected unique token from the plurality of unique tokens, and
  transit via the RF antenna an RF signal based upon the selected unique token when the biometric data matches an authentic biometric data template.

11. The secure access token device of claim 10 wherein the additional input comprises a tap input on the fingerprint scanner device.

12. The secure access token device of claim 10 wherein the additional input comprises a swipe input on the fingerprint scanner device.

13. The secure access token device of claim 10 wherein the processor is configured to store the authentic biometric data template in the memory.

14. The secure access token device of claim 10 wherein the processor is configured to activate the status visual indicator when the biometric data matches the authentic biometric data template.

15. The secure access token device of claim 10 wherein the processor is configured to:
  store a plurality of identification records in the memory, each identification record comprising visual identification data; and
  generate a user interface on the display to render the visual identification data of a selected identification record of the plurality of identification records, the user interface switching between the visual identification data of the selected identification record rendered in a first user-readable format and a second machine-readable format based upon the fingerprint scanner device.

16. A method for making a secure access token device, the method comprising:
  coupling a battery to be carried by a portable housing;
  coupling a biometric input device to be carried by the portable housing and configured to generate biometric data of a user;
  coupling a status visual indicator to be carried by the portable housing;
  coupling a radio frequency (RF) antenna to be carried by the portable housing;
  coupling a memory to be carried by the portable housing; and
  coupling a processor to be carried by the portable housing and to the battery, the biometric input device, the status visual indicator, the RF antenna, and the memory;
  the processor configured to
    store a plurality of unique tokens in the memory for accessing respective different secured resources,
    determine a selected unique token from the plurality of unique tokens based upon an additional input on the biometric input device, and
    transit via the RF antenna an RF signal based upon the selected unique token when the biometric data matches an authentic biometric data template.

17. The method of claim 16 wherein the additional input comprises a tap input on the biometric input device.

18. The method of claim 16 wherein the additional input comprises a swipe input on the biometric input device.

19. The method of claim 16 wherein the processor is configured to store the authentic biometric data template in the memory.

20. The method of claim 16 wherein the processor is configured to activate the status visual indicator when the biometric data matches the authentic biometric data template.

* * * * *